United States Patent
Aota et al.

(10) Patent No.: US 7,447,399 B2
(45) Date of Patent: Nov. 4, 2008

(54) OPTICAL SWITCH, AND APPARATUS AND METHOD FOR CONTROLLING OPTICAL SWITCH

(75) Inventors: Hirofumi Aota, Yokohama (JP); Tamotsu Akashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 11/082,806

(22) Filed: Mar. 18, 2005

(65) Prior Publication Data

US 2006/0140536 A1 Jun. 29, 2006

(30) Foreign Application Priority Data

Dec. 27, 2004 (JP) ............... 2004-376932

(51) Int. Cl.
*G02B 6/26* (2006.01)
(52) U.S. Cl. ............... 385/18; 385/15; 385/16; 385/17; 385/24; 385/37; 398/81
(58) Field of Classification Search ............... 385/18, 385/19, 15–17, 33, 27, 37, 81
See application file for complete search history.

(56) References Cited

U.S. PATENT DOCUMENTS

| | | | |
|---|---|---|---|
| 6,501,877 B1 | 12/2002 | Weverka et al. | 385/31 |
| 6,594,415 B1 | 7/2003 | Cappiello et al. | 385/24 |
| 6,707,959 B2 * | 3/2004 | Ducellier et al. | 385/17 |
| 6,798,941 B2 * | 9/2004 | Smith et al. | 385/18 |
| 2002/0071627 A1 | 6/2002 | Smith et al. | 385/15 |
| 2002/0191894 A1 * | 12/2002 | Culver et al. | 385/16 |
| 2004/0252938 A1 * | 12/2004 | Ducellier et al. | 385/27 |

FOREIGN PATENT DOCUMENTS

WO WO 03/098856 11/2003

* cited by examiner

*Primary Examiner*—Brian Healy
*Assistant Examiner*—Guy G Anderson
(74) *Attorney, Agent, or Firm*—Staas & Halsey LLP

(57) ABSTRACT

In an optical switch comprising a wavelength spatially dispersive optical element for spatially dispersing a wavelength-multiplexed beam according to wavelengths, a plurality of output ports and a plurality of mirrors onto which beams dispersed by the element are irradiated, and each of which is able to direct a reflected beam to any one of the plural output ports, when an incident position of a reflected beam irradiated onto any one of the output ports is changed, the angle of the reflecting surface of a corresponding mirror among the plural mirrors is changed in a direction other than a direction in which the mirrors are arranged, whereby a protuberance in the vicinity of the out-band (side lobe) of the transmission band characteristic of the optical switch can be suppressed.

20 Claims, 18 Drawing Sheets

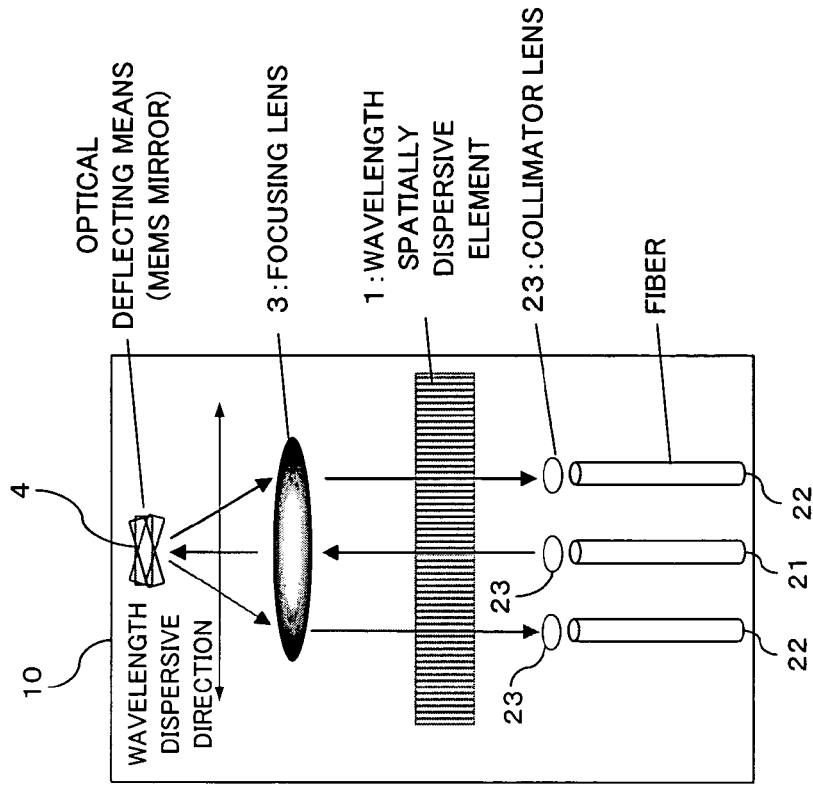
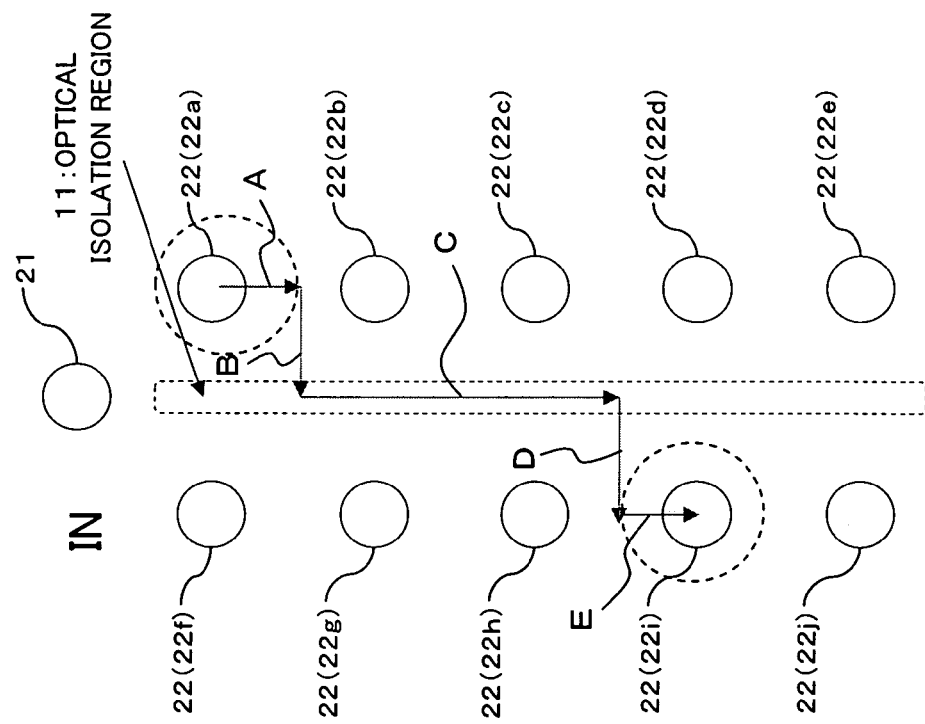

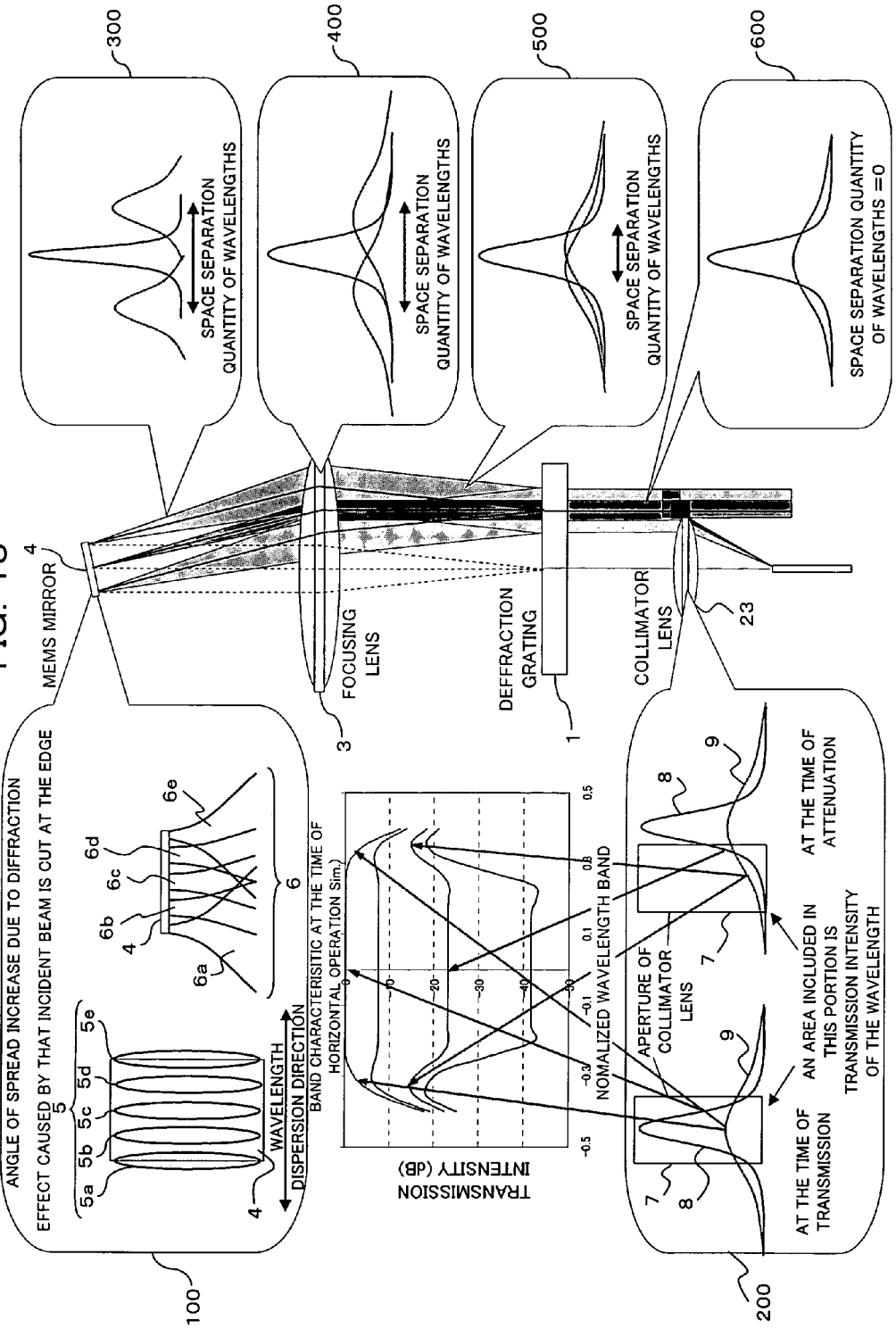

OPTICAL SWITCH, AND APPARATUS AND METHOD FOR CONTROLLING OPTICAL SWITCH

CROSS REFERENCE TO THE RELATED APPLICATIONS

This application is based on and hereby claims priority to Japanese Application No. 2004-376932 filed on Dec. 27, 2004 in Japan, the contents of which are hereby incorporated by reference.

BACKGROUND OF THE INVENTION (1) Field of the Invention

The present invention relates to an optical switch, and an apparatus and method for controlling the optical switch. Particularly, the present invention relates to a technique suitable for use at the case where an optical path is deflected by changing an angle of a reflecting surface to direct a reflected beam to any one of a plurality of output ports.

(2) Description of Related Art

Heretofore, switching of channels in an optical transmission system is performed by means of an electric switch after an optical signal is converted into an electric signal. However, use of a switch (optical switch) for switching an optical signal as it is without converting the optical signal into an electric signal can improve the channel switching speed and the efficiency.

FIGS. 13, 14 and 15 show a structure of an optical switch. FIG. 13 is a schematic perspective view of an optical switch, FIG. 14 is a schematic side view of the same, and FIG. 15 is a schematic plan view of the same.

As shown in FIGS. 13 through 15, the optical switch 10 comprises, for example, a wavelength spatially dispersive optical element (wavelength spatially dispersing means) 1 for dispersing a WDM (Wavelength Division Multiplexed) spatially beam according to wavelengths, an input/output optical system (an input optical system and an output optical system) 2 having an input port (input fiber) 21 and output ports (output fibers) 22 arranged in an array, a plurality of collimator lenses [collimator lens array (collimating means)] 23, etc., a focusing lens [focusing optical system (focusing means)] 3, and a movable reflector 70 having MEMS mirrors (optical deflecting means) 4 corresponding to respective plural disperse wavelengths.

As the above wavelength spatially dispersive optical element 1, a diffraction grating of the transmission type is used, for example. The wavelength spatially dispersive optical element 1 is inputted thereto a WDM beam from the input port 21, disperses wavelength components contained in the WDM beam to different directions according to the wavelengths, and outputs the wavelength components.

The above movable reflector 70 is provided with a plurality of micro mirrors (MEMS mirrors) 4 as an optical deflecting means arranged in an array in the direction of wavelength dispersion by the element (diffraction grating) 1. Each of the MEMS mirrors 4 fulfills a function as a wavelength selecting switch, which reflects a beam irradiated on itself, which corresponds to its own position, among beams dispersed by the above element 1, and directs the beam to any one of the plural output ports 22 in the input/output optical system 2.

Selection of the output port 22 can be done by changing the angel of the reflecting surface of the MEMS mirror 4. By independently controlling the angle of the reflecting surface of each of the MEMS mirrors 4, different switching can be performed for each of a plurality of wavelengths, separately.

For example, as shown in FIGS. 14 and 15, by changing the angle of the reflecting surface of one MEMS mirror 4 so as to direct the reflected beam to a different output port 23 (for example, changing the angle of the reflecting surface along a direction in which ports 21 and 22 are arranged), it is possible to distribute a predetermined wavelength contained in the WDM beam inputted from the input port 21 to any one of the output ports 22 (for example, refer to Patent Document 1 below).

By finely changing the angel of each of the MEMS mirrors 4, not dynamically moving the angle as an output port 22 is selected, it is possible to attenuate the optical intensity inputted to the output port 22 (that is, to realize the optical attenuator function).

Each of the MEMS mirrors 4 is operable about two axes, that is, the mirror angle thereof can be changed in both a direction along wavelength dispersion direction (horizontal direction) as shown in FIG. 14, and a direction (vertical direction) perpendicular to the wavelength dispersion direction as shown in FIG. 15.

Patent Document 1: Published Japanese Translations of PCT International Publication for Patent Application No. 2003-515187

When the output port 22 is switched, the mirror angle of the MEMS mirror 4 is changed in a direction along the arrangement of the output ports 22 if a port to be switched to is an adjacent port 22. When it is necessary to switch to a port not adjacent, it is necessary to avoid a leakage of the beam to an adjacent port 22.

As schematically shown in FIG. 16, the mirror angle of the MEMS mirror 4 is first changed in the horizontal direction (a direction along the wavelength dispersion direction) to move the beam position to a position (a position at which the beam does not leak to the output port 22: this being called an optical isolation region 11) away, in the horizontal direction, from the position of an erstwhile output port (22a) (refer to an arrow A). After that, the mirror angle is changed in the vertical direction (a direction perpendicular to the wavelength dispersion direction) to move the beam position to a position corresponding to the center position of a target output port 22 (22c) (refer to an arrow B). Next, the mirror angle is again changed in the horizontal direction (but in the direction opposite to the first) to move the beam to the target output port 22 (22c), and the beam is irradiated thereon (refer to an arrow C).

According to the port switching as above, it becomes possible to decrease the distance (pitch) between the output ports 22 (to about 1.5 mm).

However, such switching operation causes the transmission band characteristic to have shapes shown in FIG. 17 when the output port is switched (when the beam is attenuated). FIG. 17 shows a relationship between the beam spot radius and the band characteristic containing an effect of diffraction, expressing a plurality of different characteristics obtained at respective angles (0°, 1.2°, 1.5° and 2.0°) of the MEMS mirror 4 when the angle of the MEMS mirror 4 is changed. In FIG. 17, the vertical axis represents the transmission intensity (dB), whereas the horizontal axis represents the wavelength band, with the width (length in the dispersion direction) of the MEMS mirror 4 being 1 (±0.5), that is, a normalized wavelength band. FIG. 17 indicates that, as the angle of the MEMS mirror 4 increases, convex portions of the transmission band characteristic rising from the flat portion in the middle generates, that is, protuberances in the vicinity of the out-bands (the side lobes) of the transmission band generates.

FIG. 18 shows the principle of this.

It is assumed that each beam having been dispersed by the wavelength spatially dispersive optical element 1 is the center wavelength, each MEMS mirror 4 is so set that each beam having the center wavelength is irradiated onto the center position of the MEMS mirror 4. If each wavelength contained in the WDM beam is not practically shifted from the center wavelength, each beam is irradiated onto the center position of the MEMS mirror 4, as denoted by a reference character 5c in a balloon 100 in FIG. 18.

When the center wavelength of each dispersed beam is shifted (when the beam contains a shifted component), the beam is irradiated onto a position denoted by a reference character 5b or 5d in the balloon 100 in FIG. 18. When the beam is further shifted, the beam is irradiated onto the edge's side of the MEMS mirror 4 (the edge's side of the MEMS mirror 4 with respect to the wavelength dispersion direction) as denoted by a reference character 5a or 5e in the balloon 100 in FIG. 18.

Here, attention should be given to that diffraction generates in the reflected beam 6 (6a, 6e) when the incident beam is irradiated onto a portion in the vicinity of the edge of the MEMS mirror 4 as shown in the balloon 100 in FIG. 18 because a part of the incident beam 5 (5a, 5e) is cut, thus the spot radius increases as compared with the reflected beam 6 (6b through 6d) at the time that the beam is irradiated onto a portion in the vicinity of the center of the MEMS mirror 4.

When the spot radius increases as above, the side lobe of the reflected beam 6 is lifted (refer to a curve 9) as shown in a balloon 200 in FIG. 18. In the side lobe portion, the beam power is larger than the power (refer to a curve 8) of the reflected beam 6 reflected from a portion in the vicinity of the center of the MEMS mirror 4. Namely, when the reflecting surface of the MEMS mirror is inclined toward the wavelength dispersion direction, the incident beam is further cut at the edge. However, this inclination of the reflecting surface causes the power of the side lobe portion of the reflected beam 6 to be cut by the aperture (area) 7 of the collimator lens 23 (that is, an area included in a portion denoted by a reference character 7 is the transmission intensity of the wavelength), thus the output beam intensity from a portion in the vicinity of the edge of the MEMS mirror 4 is further increases.

Namely, since the nearer the edge of the MEMS mirror 4, the more the cut quantity of the reflected beam 6 is, the effect of diffraction increases at the time of switching of port in the wavelength dispersion direction, as described above. If there is no effect of the diffraction, the transmission band characteristic would be trapezoidal because there is only a change in beam power caused by that the reflected beam 6 is cut. However, the effect of diffraction adds a trapezoidal transmission band characteristic, as shown in FIGS. 17 and 18.

Meanwhile, why the peaks of the reflected beams 6 at difference wavelengths are at the same position in space (spatial separation quantity=0) is that the reflected beams 6 are focused by the focusing optical system 3 and the beams are made parallel by changing the angles by the wavelength dispersive optical element 1, as shown in balloons 300, 400, 500 and 600 in FIG. 18. The width of the aperture 7 shown in the balloon 200 in FIG. 18 shows an aperture to the output optical system 2 composed of mainly the collimator lens 23. The width of the aperture 7 increases, correspondingly to the area of the collimator lens 23.

When a convex transmission band characteristic above the flat portion in the middle (that is, a protuberance in the vicinity of the out-band (the side lobe) of the transmission band generates, the convex portion is also amplified in optical amplification by an optical amplifier when this is used in an optical system. This causes degradation of the S/N ratio. This becomes noticeable in multi-stage connections, which limits the number of the multi-stage connections, preventing the system structure from having high freedom.

SUMMARY OF THE INVENTION

In the light of the above drawbacks, an object of the present invention is to suppress a protuberance in the vicinity of the out-band (side lobe) of the transmission band characteristic of an optical switch.

In order to attain the above object, the present invention adopts an optical switch, and an apparatus and method for controlling the optical switch below:

(1) An optical switch according to this invention comprises a wavelength spatially dispersive optical element for spatially dispersing a wavelength-multiplexed beam according to wavelengths, a plurality of output ports, a plurality of mirrors onto which beams dispersed by the wavelength spatially dispersive optical element are irradiated, each of which is able to direct a reflected beam to any one of the plural output ports by changing an angle of a reflecting surface thereof, and a controlling apparatus for changing, when changing an incident position of the reflected beam irradiated onto any one of the output ports, an angel of a reflecting surface of a corresponding mirror among the plural mirrors to a direction other than a direction in which the mirrors are arranged.

(2) A controlling apparatus according to this invention for an optical switch comprising a wavelength spatially dispersive optical element for spatially dispersing a wavelength-multiplexed beam according to wavelengths, a plurality of output ports and a plurality of mirrors onto which beams dispersed by the wavelength spatially dispersive optical element are irradiated, each of which is able to direct a reflected beam to any one of the plural output ports by changing an angle of a reflecting surface thereof, the controlling apparatus comprising a mirror controlling means for changing, when changing an incident position of the reflected beam irradiated onto any one of the output ports, an angle of a reflecting surface of a corresponding mirror among the plural mirrors to a direction other than a direction in which the mirrors are arranged.

(3) When the reflected beam is irradiated onto any one of the output ports, the mirror controlling means may change the angle of the reflecting surface of the corresponding mirror to a direction other than the direction in which the mirrors are arranged so that the reflected beam is moved from a direction other than the direction in which the mirrors are arranged and irradiated.

(4) When the incident position of the reflected beam irradiated onto any one of the output ports is changed to another output port not adjacent to the output port, the mirror controlling means may control the angle of the reflecting surface of the corresponding mirror in such a manner that the controlling means moves the incident position of the reflected beam in a direction other than the direction in which the mirrors are arranged, and combines movements of the incident position in the direction in which the mirrors are arranged and a direction other than the direction in which the mirrors are arranged so as to irradiate the beam onto the another output port.

(5) The mirror may be operable about two axes so as to be able to change the angle of the reflecting surface thereof in the direction in which the mirrors are arranged and a direction in which the output ports are arranged, which is perpendicular to the direction in which the mirrors are arranged, and, when the incident position of the reflected beam irradiated onto any one of the output ports is changed to another output port not adjacent to the output port, the mirror controlling means may control the angle of the reflecting surface of the mirror in such a manner that the mirror controlling means controls the angle of the reflecting surface of the corresponding mirror in the direction in which the output ports are arranged to move the incident position of the reflected beam toward an adjacent output port, and combines controls on the angle of the reflecting surface of the mirror in the direction in which the mirrors are arranged and the direction in which the output ports are arranged so as to move the incident position to the another output port.

(6) When the incident position is moved toward the adjacent output port, the mirror controlling means may monitor an optical power at the adjacent output port, and control the angle of the reflecting surface of the mirror so that a monitor value obtained in the monitoring does not exceed an allowable crosstalk level.

(7) The mirror controlling means may control the angel of the reflecting surface of the mirror to a predetermined designed angle so that an optical power at the adjacent output port does not exceed an allowable crosstalk level.

(8) It is preferable that a distance between the output port is set to be within a range in which an optical transmission band characteristic at an output port from which the incident position is moved is below a predetermined designed attenuation level and the optical transmission band characteristic at the adjacent output port does not exceed the allowable crosstalk level when the incident position is moved toward the adjacent output port by the mirror controlling means.

(9) A controlling apparatus according to this invention for an optical switch comprising a wavelength dispersive optical element for dispersing a wavelength-multiplexed beam according to wavelengths, a plurality of output ports and a plurality of mirrors onto which beams dispersed by the wavelength dispersive optical element are irradiated, each of which is being able to direct a reflected beam to any one of the plural output ports by changing an angle of a reflecting surface thereof, the controlling apparatus comprising, when an incident position of the reflected beam irradiated onto any one of the output port is changed, a mirror controlling means changing an angle of a reflecting surface of a corresponding mirror among the plural mirrors in a direction in which said mirrors are arranged within a range not exceeding an allowable transmittance in a portion of a side lobe of an optical transmission band characteristic at the output port.

(10) A controlling method according to this invention in an optical switch comprising a wavelength spatially dispersive optical element for spatially dispersing a wavelength-multiplexed beam according to wavelengths, a plurality of output ports and a plurality of mirrors onto which beams dispersed by the wavelength spatially dispersive optical element are irradiated, each of which is able to direct a reflected beam to any one of the output ports by changing an angle of a reflecting surface thereof, the controlling method comprising the steps of changing, when an incident position of the reflected beam irradiated onto any one of the output ports is changed, an angle of a reflecting surface of a corresponding mirror among the plural mirrors in a direction other than a direction in which the mirrors are arranged.

(11) A controlling method according to this invention in an optical switch comprising a wavelength spatially dispersive optical element for spatially dispersing a wavelength-multiplexed beam according to wavelengths, a plurality of output ports and a plurality of mirrors onto which beams dispersed by the wavelength spatially dispersive optical element are irradiated, each of which is able to direct a reflected beam to anyone of the plural output ports by changing an angle of a reflecting surface thereof, the controlling method comprising the steps of, when an incident position of the reflected beam irradiated onto any one of the output ports is changed, changing an angle of a reflecting surface of a corresponding mirror among the plural mirrors in a direction in which the mirrors are arranged within a range not exceeding an allowable transmittance in a portion of a side lobe of an optical transmission band characteristic at the output port.

(12) An optical switch according to this invention comprises a wavelength spatially dispersive optical unit for spatially dispersing an input beam and at least two output ports, the optical switch being able to switch a port from which a dispersed beam is to be outputted between two output ports by a deflecting means, the optical switch comprising a controlling unit for performing a control including a step of moving a reflected beam in a direction perpendicular to a wavelength dispersion direction when the reflecting beam is directed to a position in the vicinity of at least a switched output port or an output port to be switched, and a step of moving the reflected beam in the wavelength dispersion direction in a portion other than the portion in the vicinity of the same.

According to this invention, it is possible to largely decrease the quantity of a protuberance in the vicinity of the out-band (side lobe) of the transmission band characteristic at the output port.

Whereby, optical amplification by an optical amplifier becomes possible without degrading the S/N ratio.

Additionally, multi-stage connections become possible, which allows the optical system to have high freedom.

Particularly, since the band characteristic can be flat, it is possible to make the optical levels of wavelengths (channels) allocated to bands uniform, thus the signal quality in all bands of a wavelength-multiplexed beam can be improved.

BRIEF DESCRIPTION OF THE DRAWINGS

FIGS. 8(A) and 8(B) are diagrams for illustrating a first modification of the embodiment;

FIG. 18 is a diagram for illustrating a principle of the transmission band characteristics at the time of the hitless port switching shown in FIG. 16.

DESCRIPTION OF THE PREFERRED EMBODIMENTS

[A] Description of Embodiment

Figure 1:
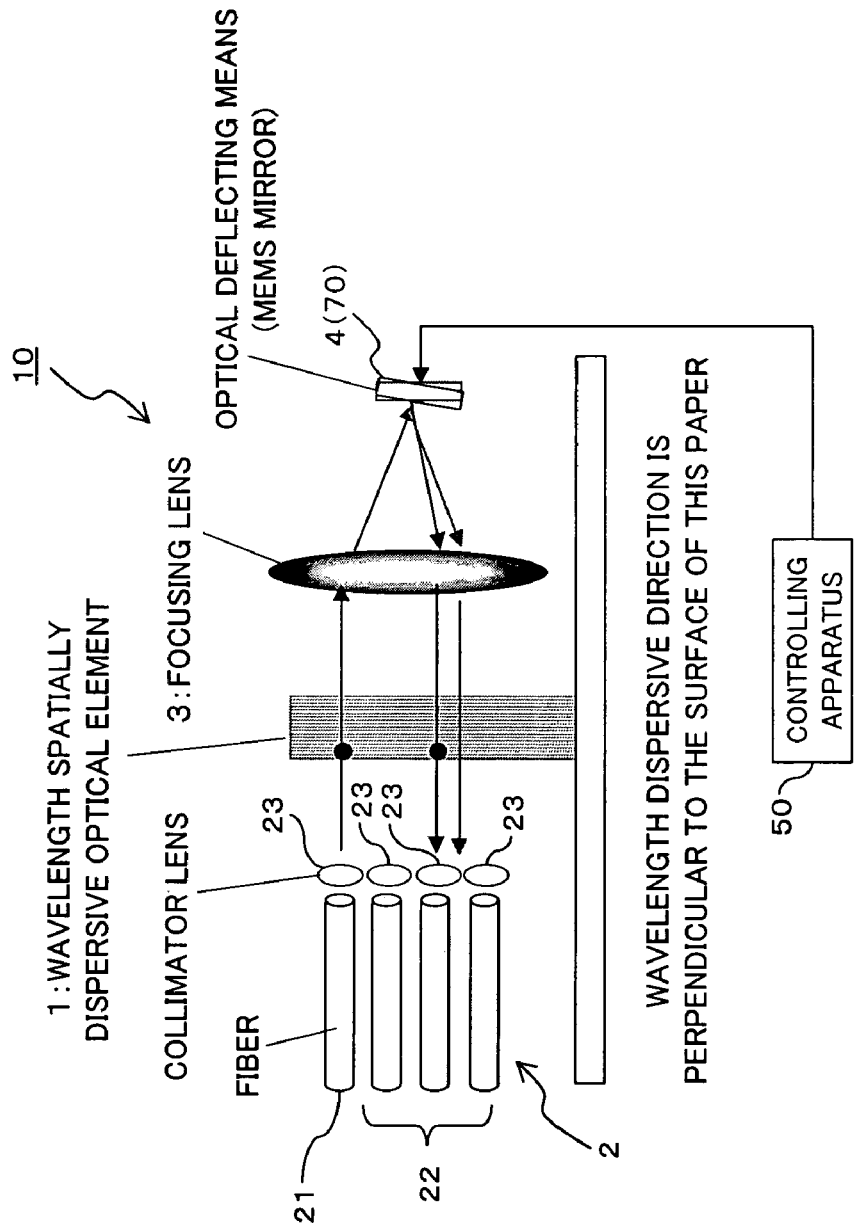
FIG. 1 is a schematic side view showing a structure of an optical switch according to an embodiment of this invention.
Figure 13:
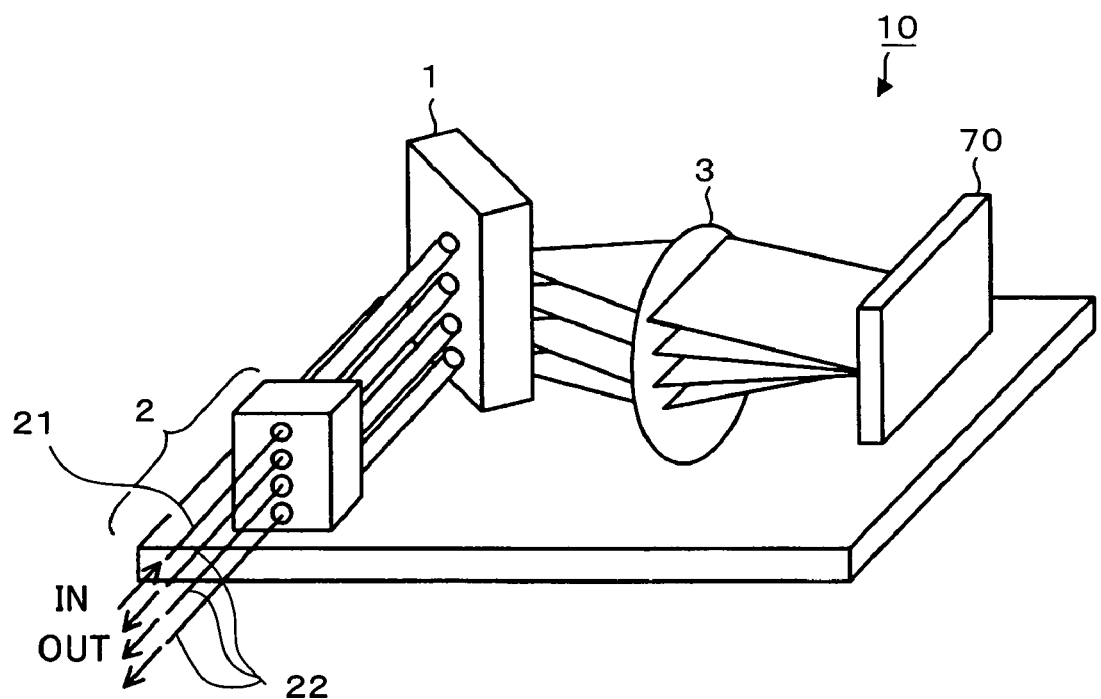
FIG. 13 is a schematic perspective view of an optical switch.
Figure 14:
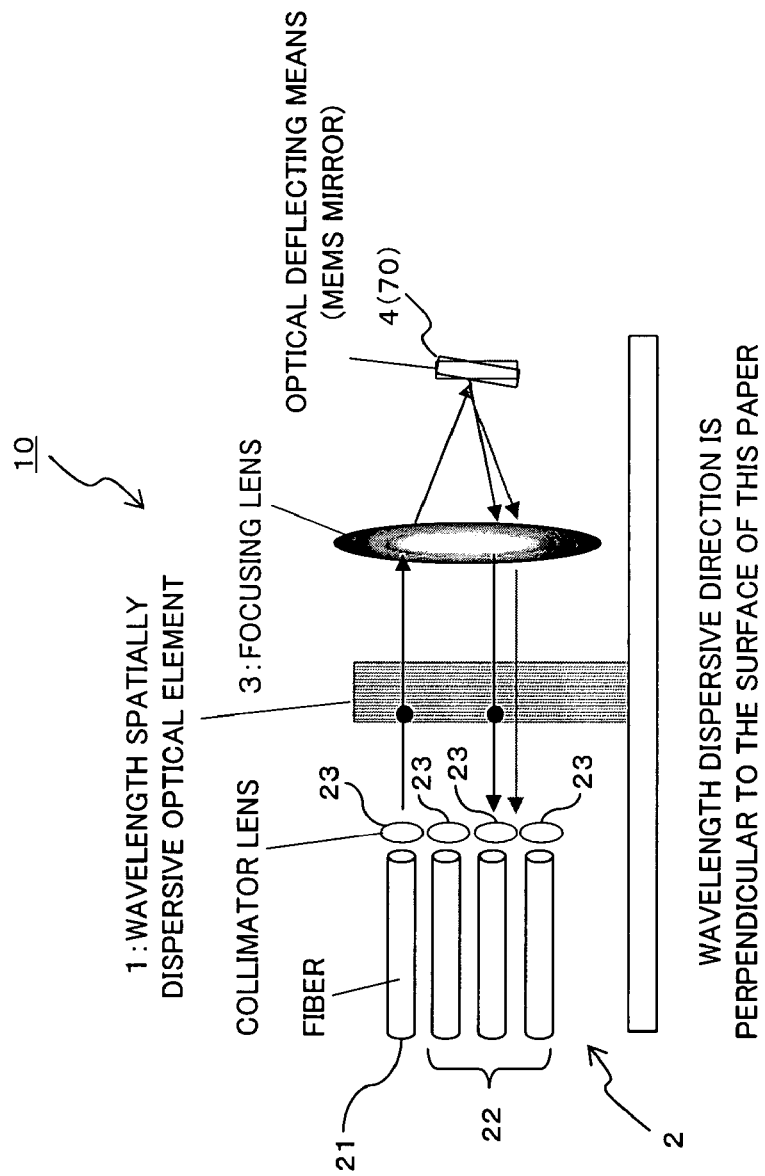
FIG. 14 is a schematic side view of the optical switch.
Figure 15:
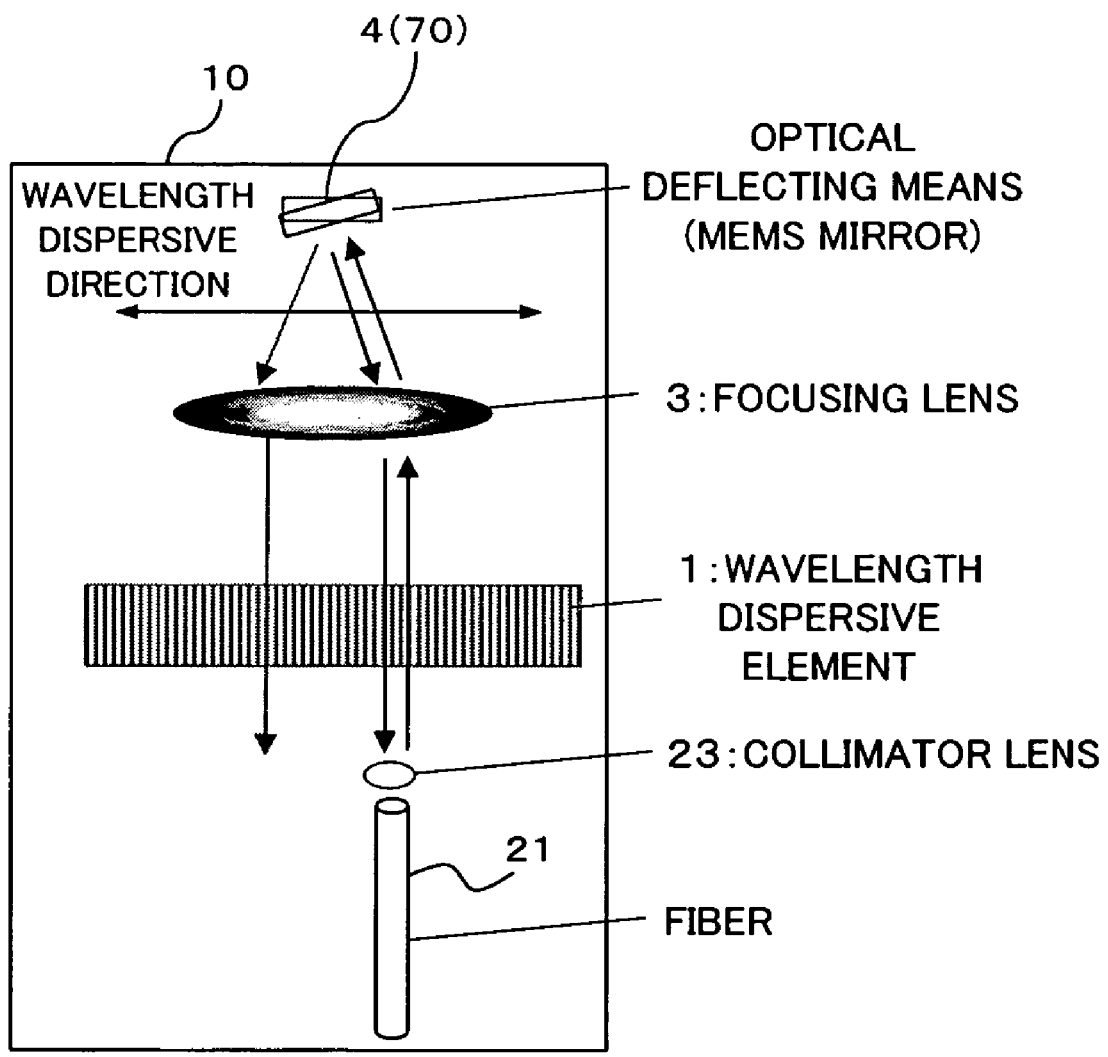
FIG. 15 is a schematic plan view of the optical switch.

FIG. 1 is a schematic side view showing a structure of an optical switch according to an embodiment of this invention. FIG. 1 corresponds to FIG. 14. As shown in FIG. 1, an optical switch 10 according to this embodiment comprises, for example, a wavelength spatially dispersive optical element (wavelength spatially dispersing means, wavelength spatially dispersing unit) 1 for spatially dispersing a WDM beam wavelength-multiplexed according to wavelengths (for each wavelength), an input/output optical system (an input optical system and an output optical system) 2 having an input port (input fiber) 21 and output ports (output fibers) 22 arranged in an array, a plurality of collimator lenses [collimator lens array (collimating means)] 23, etc., a focusing optical system (focusing means) 3, and a movable reflector 70 having MEMS mirrors (optical deflecting means, deflecting means) 4 corresponding to plural dispersed wavelengths (for example, corresponding to center wavelengths of channels), respectively, like the optical switch described above with reference to FIGS. 13 through 15. Each of the MEMS mirrors 4 is separately controlled by a controlling apparatus (mirror controlling means, controlling unit) 50.

Here, it is assumed that the output ports 22 are arranged in an array (in a direction perpendicular to the wavelength dispersion direction), for example. The MEMS mirrors 4 as being optical deflecting means are arranged in an array (in the dispersing direction), for example.

Alternatively, there may be a case where all the output ports 22 are not arranged in an array, but at least two output ports 22 are arranged and at least one MEMS mirror 4 switches the port between the two output ports 22. Here, attention should be paid to that switching between the two output ports 22 to be described later can be handled as switching between these two output ports.

In this embodiment, each of the MEMS mirrors 4 is operable about two axes. Namely, the mirror angle of each of the MEMS mirrors 4 can be changed at least in both a direction (the horizontal direction) along the wavelength dispersion direction (a direction in which the MEMS mirrors 4 are arranged) and a direction (a direction in which the output ports 22 are arranged; the vertical direction) perpendicular to the wavelength dispersion direction. In the following description, like reference characters designate like or corresponding parts described above, unless specifically mentioned.

Figure 2:
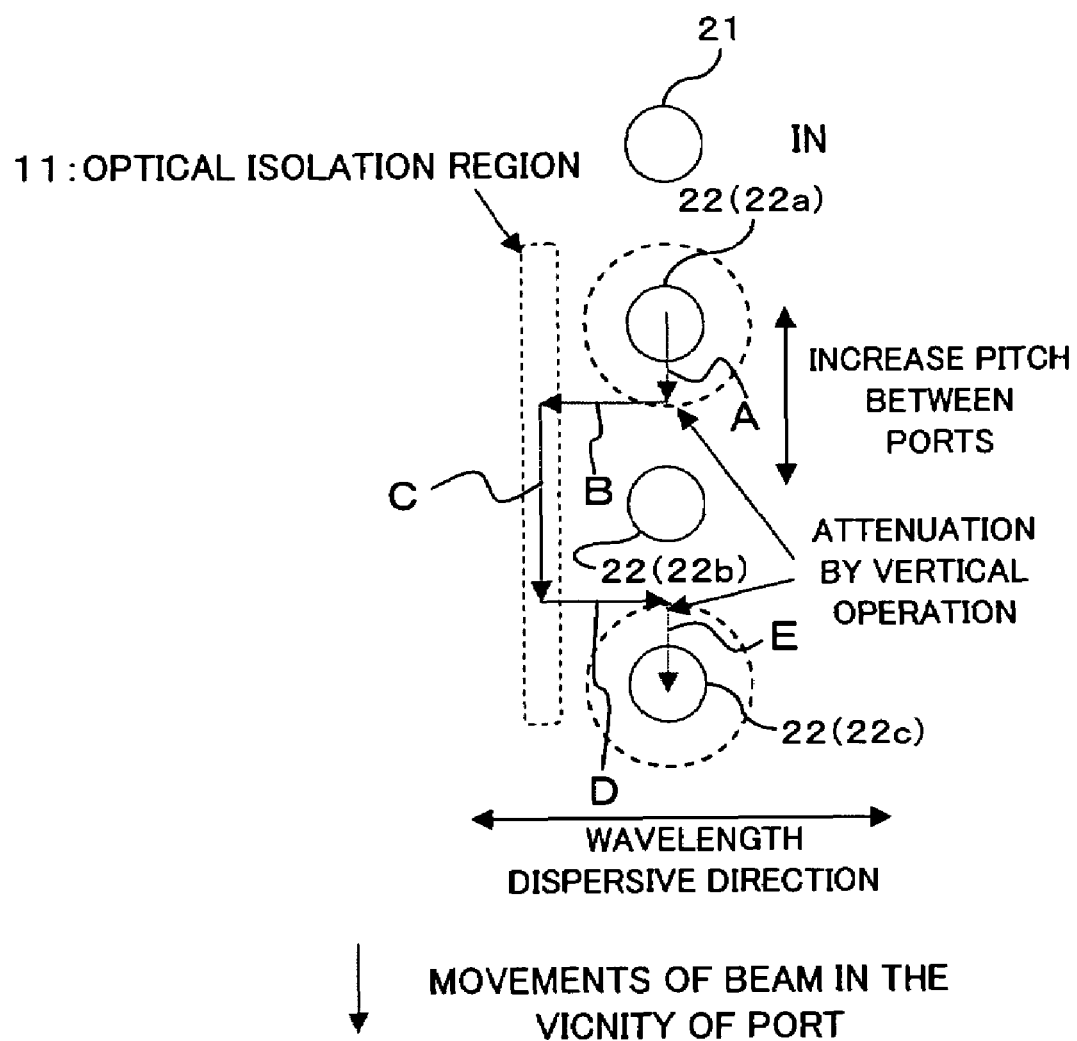
FIG. 2 is a diagram for illustrating an operation (hitless port switching) of the optical switch shown in FIG. 1.
Figure 16:
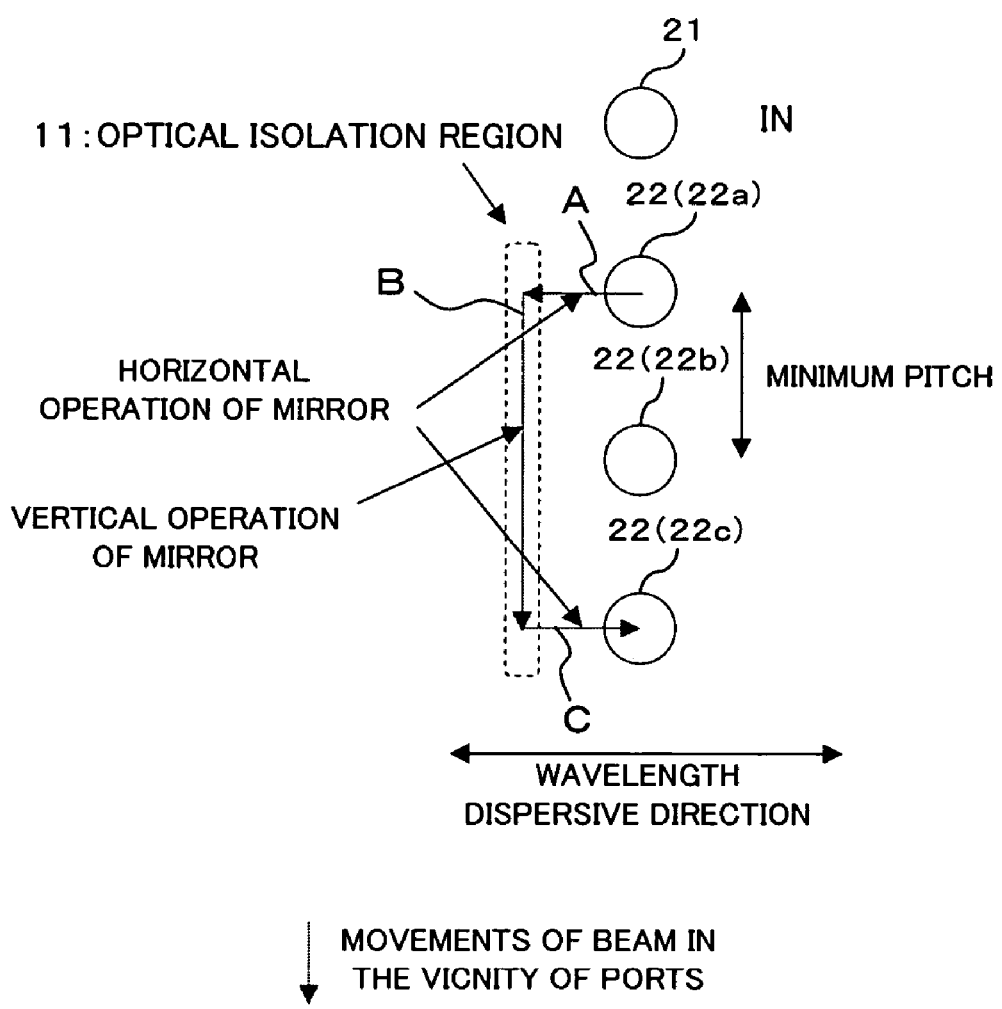
FIG. 16 is a schematic diagram for illustrating a known optical switch controlling method (hitless port switching)

Like the case described above with reference to FIG. 16, when the incident position of the a reflected beam 6 irradiated onto, for example, an output port 22a is switched to an output port 22c, which is another port (here, the output port 22c is not an adjacent port, but may be an adjacent port), the controlling apparatus 50 according to this embodiment controls the mirror angel of the MEMS mirror 4 in such a manner that the reflecting surface of the mirror is tilted in a direction (for example, a direction perpendicular to the wavelength dispersion direction) differing from the wavelength dispersion direction, after that, the incident position of the reflected beam 6 is directed to a non-adjacent port, making a detour around the adjacent port, as schematically shown in FIG. 2, for example.

Preferably, when directing the incident position of the reflected beam 6 to the non-adjacent port, the controlling apparatus 50 controls the mirror angle of the MEMS mirror 4 so that the reflecting surface of the mirror facing to a direction differing from the wavelength dispersion direction is finally tilted toward the wavelength dispersion direction.

Namely, the controlling apparatus 50 changes the mirror angle of the MEMS mirror 4 in the vertical direction (for example, a direction perpendicular to the wavelength dispersion direction) to move the incident position of the reflected beam 6 toward the adjacent output port 22b (in a direction perpendicular to the wavelength dispersion direction) (refer to an arrow A). The quantity of movement at this time is controlled to be within a region in which leakage of the beam to the adjacent output port 22b does not exceed an allowable crosstalk level to be described later with reference to FIG. 5, for example. In more detail, the controlling apparatus 50 can perform two ways. One is that the controlling apparatus 50 monitors the power of the incident beam to the output port 22b and controls the mirror angle within a range in which the monitor value does not exceed the allowable crosstalk level, and moves the beam position. The other is that the controlling apparatus 50 moves the beam position to a designed value position which is beforehand so determined that the leakage of the beam does not exceed the allowable crosstalk level (that is, the controlling apparatus 50 controls the reflecting surface of the MEMS mirror 4 at a designed angle which is beforehand so determined that the leakage of the beam does not exceed the allowable crosstalk level).

Next, the controlling apparatus 50 changes the mirror angle to the horizontal direction (for example, the wavelength dispersion direction) to move the beam incident position into an optical isolation region 11 (refer to an arrow B), then changes the mirror angle in the vertical direction to linearly move the beam incident position in the optical isolation region 11 toward the target output port 22c (for example, a direction perpendicular to the wavelength dispersion direction) (refer to an arrow C). When moving the beam position to a position between the output ports 22b and 22c, for example, the controlling apparatus 50 moves the beam position to a position in the optical isolation region 11 corresponding to a position (starting position of an arrow E) at which leakage of the beam to the output port 22b adjacent to the target output port 22c does not exceed the allowable crosstalk level. In more detail, the controlling apparatus 50 can perform two ways, as well. One is that the controlling apparatus 50 monitors the power of the incident beam to the output port 22b, for example, and controls the mirror angle to move the beam incident position to a position at which the monitor value does not exceed the allowable crosstalk level. The other is that the controlling apparatus 50 moves the incident beam position to a designed value position which is beforehand so determined that the leakage of the beam does not exceed the allowable crosstalk level.

The controlling apparatus 50 again changes the mirror angle in the horizontal direction (the wavelength dispersion direction) (but in the direction opposite to the first horizontal direction) to linearly move the beam position up to a position corresponding to the center of the target output port 22c (refer to an arrow D). The controlling apparatus 50, again, finally changes the mirror angle in the vertical direction (a direction perpendicular to the wavelength dispersion direction) to move the beam position to the center of the target output port 22c (refer to an arrow E).

Namely, when performing switching to irradiate the reflected beam onto the output port 22c to be switched to, the controlling apparatus 50 first moves the beam directed to the center of the output port 22a, from which the beam is switched, in a direction (the vertical direction) other than a direction (the horizontal direction) in which the MEMS mirrors 4 are arranged, then moves the beam while making a detour around (avoiding) another output port interposed between the output port 22a and the output port 22c to be switched to, and finally moves the beam in a direction (the vertical direction) other than the direction (the horizontal direction) in which the MEMS mirrors 4 are arranged to direct the beam to the center of the output port 22c to be switched to.

In the port switching (or attenuating) operation, it is possible to largely decrease the quantity of a protuberance in the vicinity of the out-band (the side lobe) in the transmission band characteristic by performing the operation of deflecting the beam toward the adjacent port (in the vertical direction) in the initial stage, as compared with a case where the beam deflecting operation is performed in a direction (the horizontal direction) perpendicular to the above direction. Similarly, when the beam position is finally moved to the target output port 22c, it is possible to largely decrease the quantity of a protuberance in the vicinity of the out-band in the transmission band characteristic by moving the beam position in the vertical direction, as compared with a case where the beam position is moved in the horizontal direction in the deflecting operation and the beam is irradiated onto the target output port 22c.

The reason of this is as follows. As schematically denoted by reference characters A, B, C and D in FIG. 3, for example, the effect of diffraction starts to occur in the horizontal direction at the same time that the beam 6 is cut because the wavelength dispersion direction, that is, the direction in which the beam is moved on the beam reflecting surface of the MEMS mirror 4, is horizontal (in a direction along the wavelength dispersion direction) (refer to reference character B). To the contrary, the effect of diffraction starts to occur in the vertical direction (a direction perpendicular to the wavelength dispersion direction) after the cut of the beam 6 passes through the center line 60 in the beam vertical direction (refer to reference character D).

Figure 3:
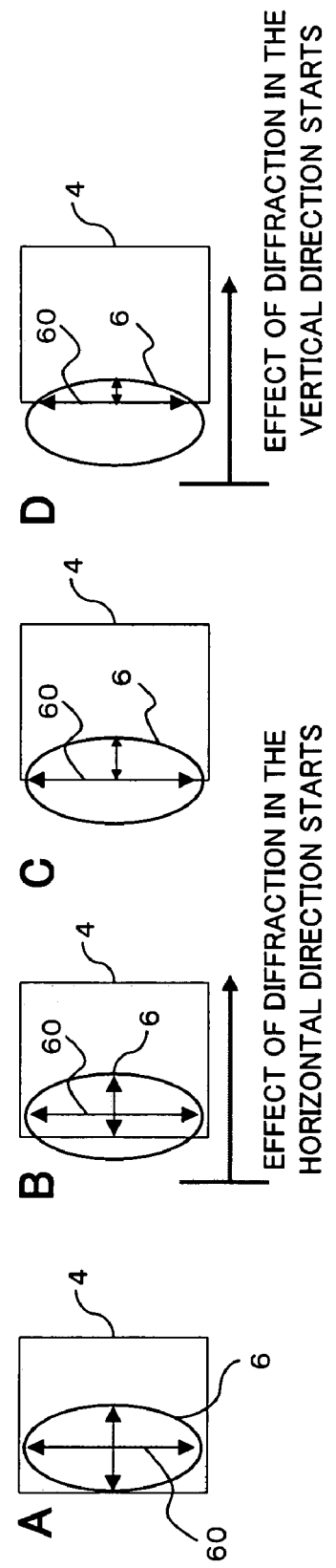
FIG. 3 is a diagram showing a beam incident position on a MEMS mirror in order to illustrate a difference in transmission band characteristic between an operation in the horizontal direction and an operation in the vertical direction of the MEMS mirror shown in FIG. 1.
Figure 4:
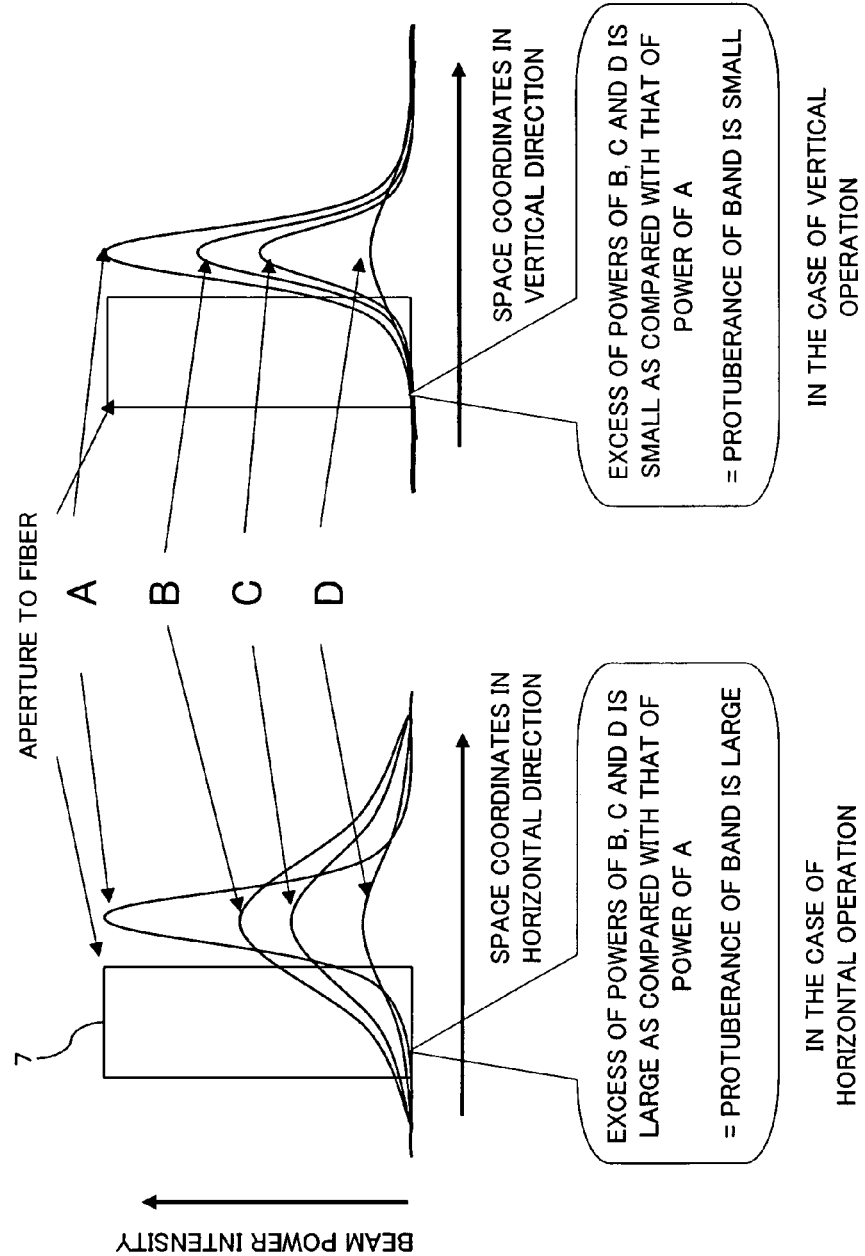
FIG. 4 is a diagram for illustrating a difference in transmission band characteristic between the operation in the horizontal direction and the operation in the vertical direction of the MEMS mirror shown in FIG. 1.
Figure 5:
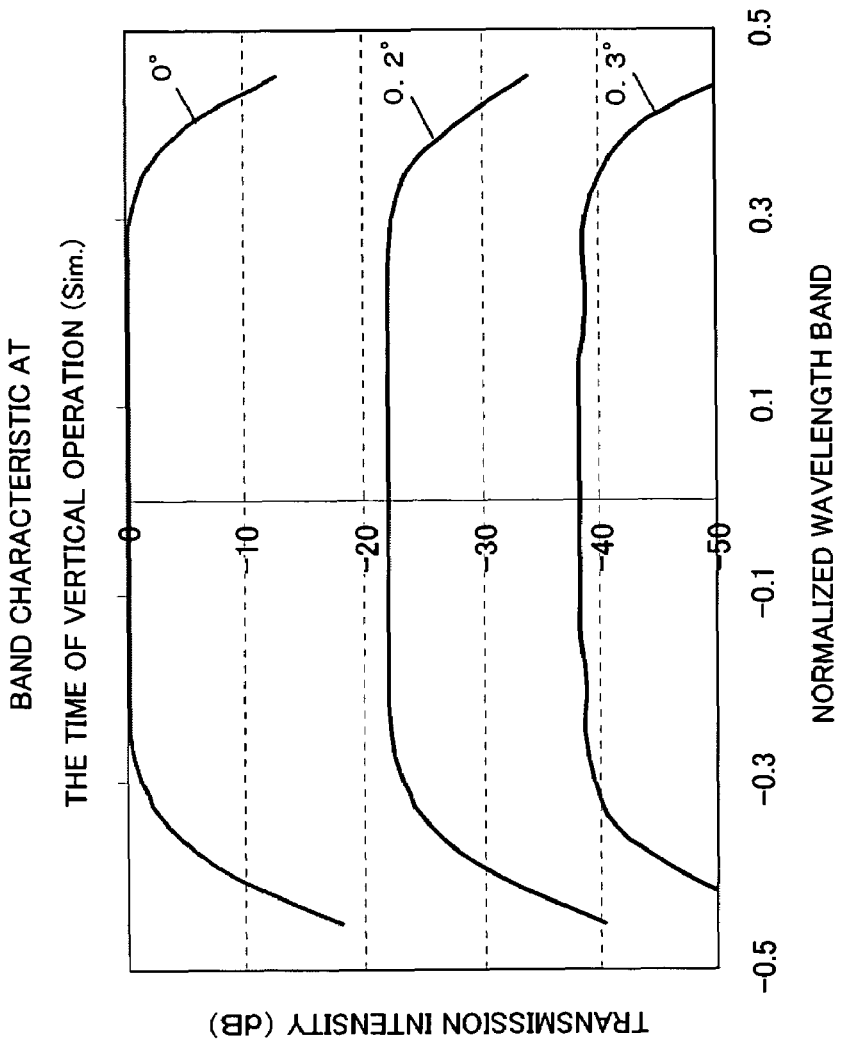
FIG. 5 is a diagram showing an example of initial band characteristics at the time of port switching in the vertical direction by the MEMS mirror shown in FIG. 1.

As shown in FIG. 4, in the deflecting operation in the horizontal direction, excess of the powers denoted by reference characters B, C and D in FIG. 3 is large at an aperture 7, as compared with a power denoted by a reference character A in FIG. 3, thus a protuberance in the vicinity of the out-band in the transmission band characteristic is large. To the contrary, in the deflecting operation in the vertical direction, excess of the powers denoted by the reference characters B, C and D in FIG. 3 is small at the aperture 7, as compared with a power denoted by the reference character A in FIG. 3, thus a protuberance in the vicinity of the out-band in the transmission band characteristic is small, as shown in FIG. 5, for example. Incidentally, characteristics in FIG. 5 show transmission band characteristics at the time that the inclination of the MEMS mirror is 0°, 0.2° and 0.3° in descending order.

Accordingly, the beam deflecting operation toward an adjacent port (in the vertical operation) is performed in the initial stage, the beam deflecting operation is then performed in a direction (the horizontal direction) perpendicular to the above direction, and the beam position is moved in the beam deflecting operation in the vertical direction when the beam position is moved to the target output port 22, as described above, whereby the quantity of a protuberance in the vicinity of the out-band in the transmission band characteristic can be largely decreased.

As a result, optical amplification by an optical amplifier becomes possible without degrading the S/N ratio. This makes multi-stage connections possible, and allows the optical system to have high freedom. Particularly, since the band characteristic can be flat, it is possible to make the optical signal levels of channels allocated to respective bands uniform, and improve the signal quantity in all bands of a wavelength-multiplexed optical signal.

When switching to an adjacent port 22 is performed, the beam position is directly moved to the target output port 22 without moving the beam position into the optical isolation region 11.

Figure 6:
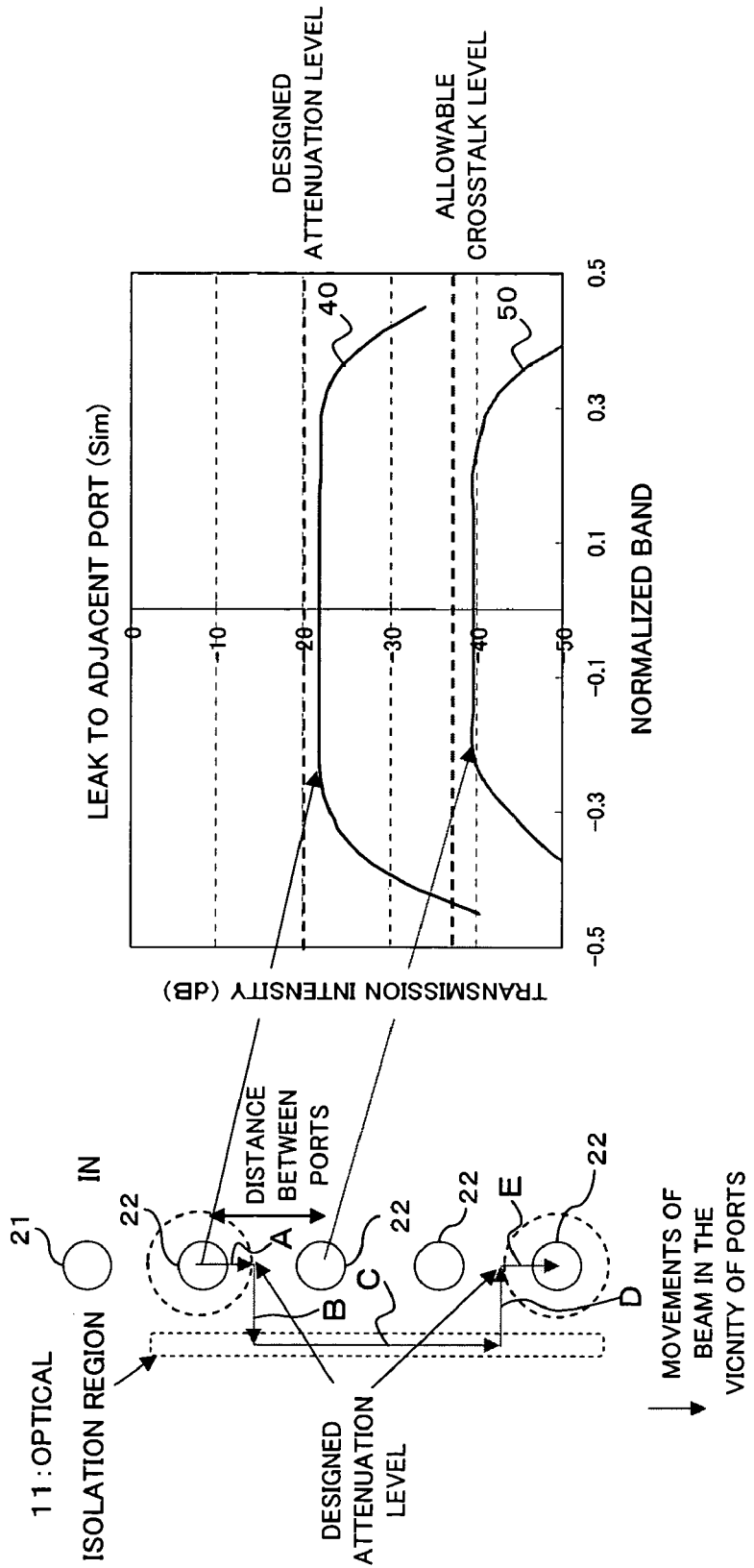
FIG. 6 is a diagram for illustrating a method of designing a distance between ports in the operation in the vertical direction of the MEMS mirror shown in FIG. 1.

When the deflecting operation in the vertical direction is performed as above, it is necessary to optimize the distance between ports on the basis of a designed attenuation level and an allowable crosstalk level because the beam 6 is moved toward an adjacent output port 22. Namely, when a certain designed attenuation level and allowable crosstalk level are determined as shown on the right side in FIG. 6, for example, the distance between ports is so designed (set) that the transmittance [transmission intensity (transmission band characteristic: refer to a curve 40)] of the beam 6 to an output port (initial connected port) 22 from which the beam 6 is moved is within a range below the set attenuation level, and the leakage (transmission band characteristic: refer to a curve 50) of the beam 6 to the adjacent output port 22 is within a range not exceeding the allowable crosstalk level. Incidentally, the curve 40 represents a transmission band characteristic obtained when the MEMS mirror 4 is inclined about 0.2°. The curve 50 represents a transmission band characteristic obtained when the MEMS mirror 4 is inclined about 0.3° in the vertical direction and about 2.5° in the horizontal direction.

For this, the pitch between ports has to be wider than the known pitch (minimum pitch).

Figure 7:
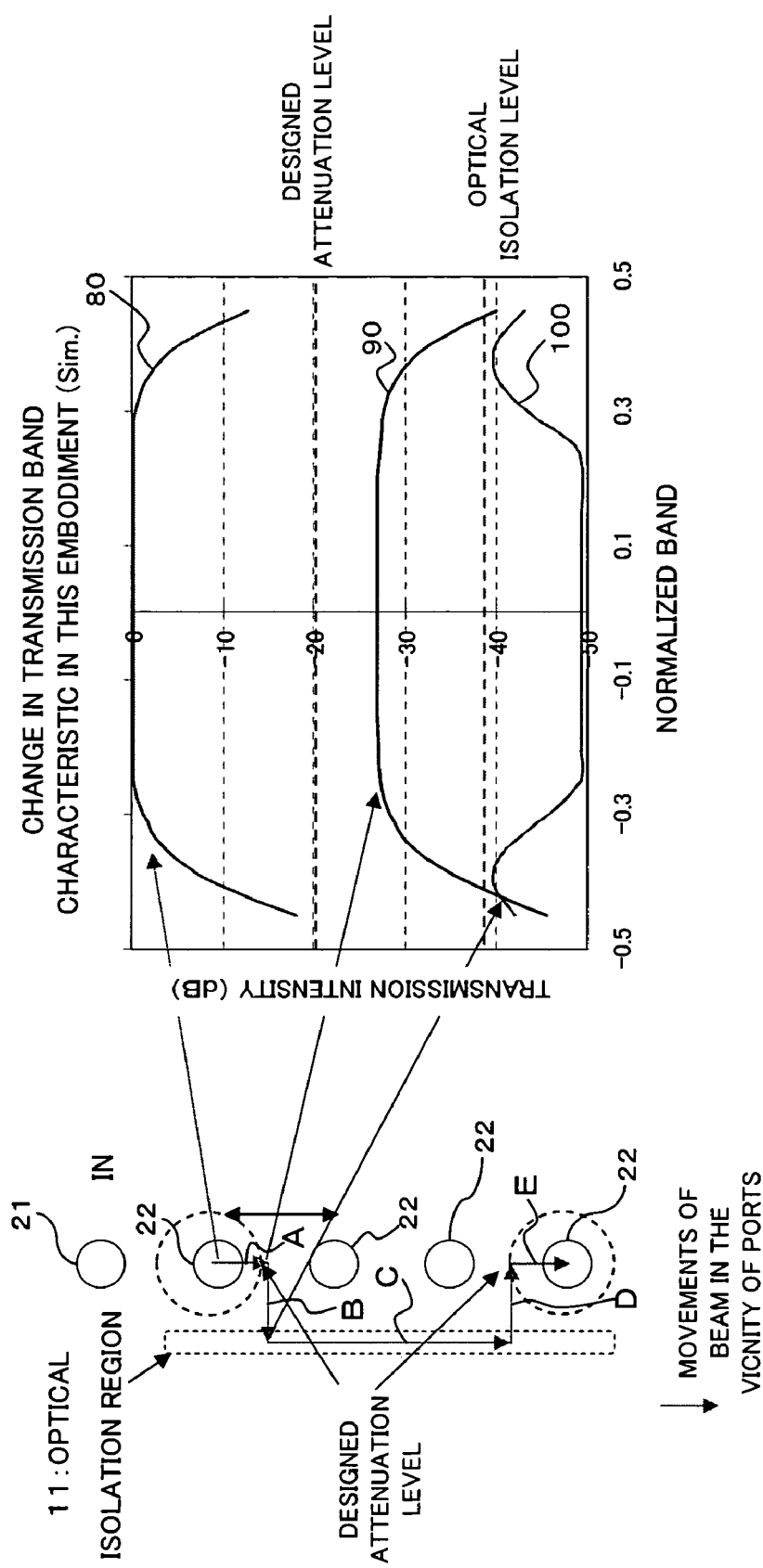
FIG. 7 is a diagram for illustrating an example of a change in transmission band characteristic at the initial connected port in the operation in the vertical direction of the MEMS mirror shown in FIG. 1.

As shown in FIG. 7, for example, by designing the distance between ports as above, it is possible to provide transmission band characteristics as denoted by curves 80 and 90 at the start and end of the initial deflecting operation (refer to an arrow A) in the vertical direction, which allows a flat characteristic in which a protuberance in the vicinity of the out-band of the transmission band is small. In the deflecting operation in the horizontal direction thereafter, a transmission band characteristic in which a protuberance is present in the vicinity of the out-band of the transmission band is provided as denoted by a curve 100 at the end of the operation, which, however, does not affect because the transmission band characteristic is within a range below the optical isolation level by the optical isolation region 11. Incidentally, the same is said in the case of the deflecting operation (refer to an arrow E) in the final stage in the vertical direction (to the target output port). In FIG. 7, the curve 80 represents a transmission band characteristic obtained when the inclination of the MEMS mirror 4 is 0°, the curve 90 represents a transmission band characteristic obtained when the inclination of the MEMS mirror is about 0.25°, and the curve 100 represents a transmission band characteristic obtained when the inclination of the MEMS mirror 4 is about 0.3° in the vertical direction and about 2.0° in the horizontal direction.

(A1) First Modification

When the above MEMS mirror 4 is configured as a MEMS mirror of a double-side swinging type, that is, the mirror angle thereof can be changed right and left in the horizontal direction (wavelength dispersion direction) as shown in FIG. 8(B), the input port 21 and the output ports 22 can be arranged as shown in FIG. 8(A), for example. Namely, ten output ports 22 (22a through 22j) are arranged in two arrays for one input port 21. Each of the arrays can be in a direction perpendicular to the wavelength dispersion direction. In this modification, a distance between the output ports 22 and a distance between the arrays are designed (set) on the basis of the designed attenuation level and the allowable crosstalk level, as described above with reference to FIGS. 6 and 7.

When the reflected beam irradiated onto an output port 22 in the first row in the right array is desired to be irradiated onto an output port 22 in the fourth row in the left array as shown in FIG. 8(A), the controlling apparatus 50 first changes the mirror angle of a corresponding MEMS mirror 4 in the vertical direction to linearly move the beam incident position of the reflected beam irradiated onto the former output port 22 toward the adjacent output port 22b (an output port in the second row in the right array) (refer to an arrow A). In this case, the controlling apparatus 50 can perform two ways, as well. One is that the controlling apparatus 50 monitors the power of an incident beam to the output port 22b, for example, controls the mirror angle within a range in which the monitor value does not exceed the allowable crosstalk value, and moves the beam position. The other is that the controlling apparatus 50 moves the beam position up to a designed value position so determined not as to exceed the allowable crosstalk value.

The controlling apparatus 50 then changes the mirror angle of the MEMS mirror 4 in the horizontal direction to linearly move the incident position of the reflected beam up to a position in the optical isolation region 11 (refer to an arrow B), and changes the mirror angle in the vertical direction to linearly move the incident position of the beam toward the target output port 22i (refer to an arrow C). When moving the beam position to a position between the third and fourth output ports 22h and 22i in the left array, the controlling apparatus 50 moves the beam position to a position in the optical isolation region 11 corresponding to a position (the start point of an arrow E) at which leakage of the beam to the output port 22h adjacent to the target output port 22i does not exceed the allowable crosstalk level.

The controlling apparatus 50 again changes the mirror angle in the horizontal direction (the same direction as the direction at the time of the first changing) to linearly move the beam position to a position corresponding to the center of the target output port 22 (refer to an arrow D), and, again, finally changes the mirror angle in the vertical direction to move the beam position to the center of the target output port 22 (refer to an arrow E).

Reversely, when changing the beam position from any one of output ports 22 in the left array to any one of output ports in right array, the controlling apparatus 50 first changes the mirror angle in the vertical direction to move the beam position in the vertical direction toward the adjacent port 22, then repeats movements of the beam position in the horizontal direction and in the vertical direction in the similar manner to the above. When the MEMS mirror 4 is a double-side swinging type, this manner can be particularly easily realized.

(A2) Second Modification

Figure 9A:
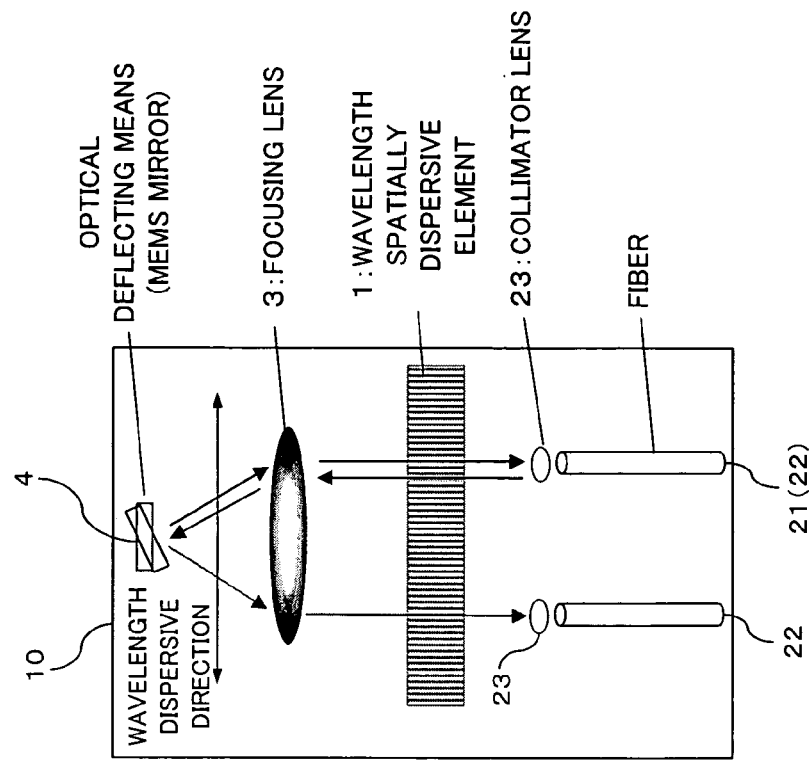
FIGS. 9(A) and 9(B) are diagrams for illustrating a second modification of the embodiment.
Figure 9B:
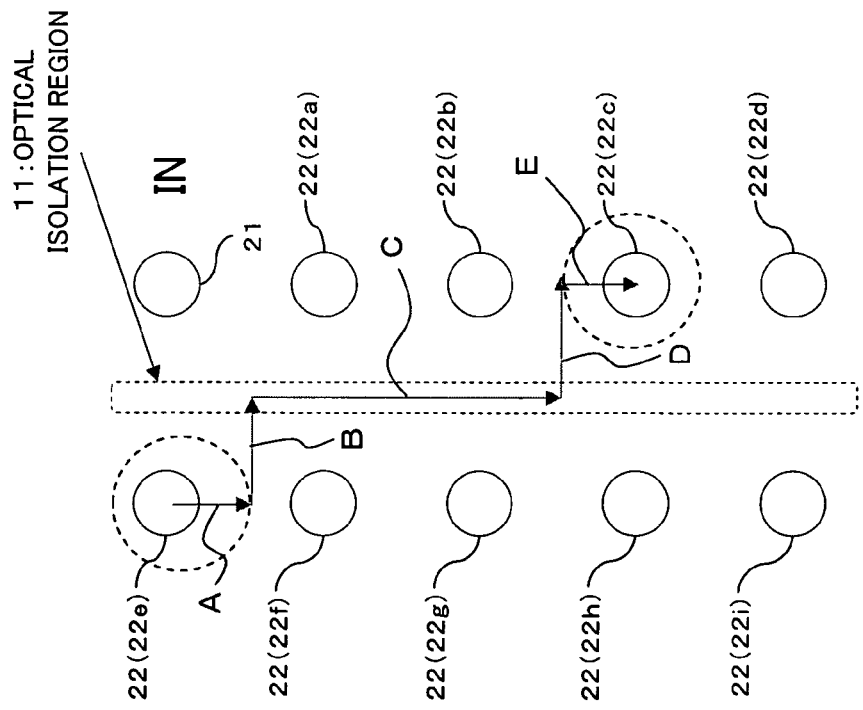

When the MEMS mirror 4 is a MEMS mirror of a single-side swinging type where the mirror angle can be change only right or left in the wavelength dispersion direction as shown in FIG. 9(B), one input port 21 and nine output ports 22 (22a through 22i) totaling ten are arranged in two arrays. In this case, the distance between output ports 22 in each array and the distance between the arrays are designed (set) on the basis of the designed attenuation level and the allow able crosstalk level, like the example described above with reference to FIGS. 6 and 7.

When the reflected beam irradiated onto an output port 22e in the first row in the left array is desired to be irradiated onto the fourth output port 22c in the right array as shown in FIG. 9(A), the controlling apparatus 50 changes the mirror angle of a corresponding MEMS mirror 4 in the vertical direction to direct the beam position of the reflected beam irradiated onto the output port 22e toward an adjacent output port (the second output port in the left array) 22f, and linearly moves the beam position up to a position within a range in which leakage of the beam to the adjacent output port 22f does not exceed the allowable crosstalk level, as well (refer to an arrow A).

The controlling apparatus 50 next changes the mirror angle of the MEMS mirror 4 in the horizontal direction to linearly move the incident position of the reflected beam to a position in the optical isolation region 11 (refer to an arrow B), and changes the mirror angle in the vertical direction to linearly move the incident position of the beam toward the target output port 22c (refer to an arrow C). In more detail, the controlling apparatus 50 moves the beam position up to a position in the optical isolation region 11 corresponding to a position (the start of an arrow E) at which leakage of the beam to an output port 22b adjacent to the target output port 22c does not exceed the allowable crosstalk level when moving the beam position to a position between the third and fourth output ports 22b and 22c in the right array.

The controlling apparatus 50 again changes the mirror angle in the horizontal direction (the same direction as the horizontal direction in the first changing) to linearly move the beam position to the position corresponding to the center of the target output port 22c (refer to an arrow D), and, again, finally changes the mirror angle in the vertical direction to move the beam position to the center of the target output port 22c (refer to an arrow E).

(A3) Third Modification

Figure 10:
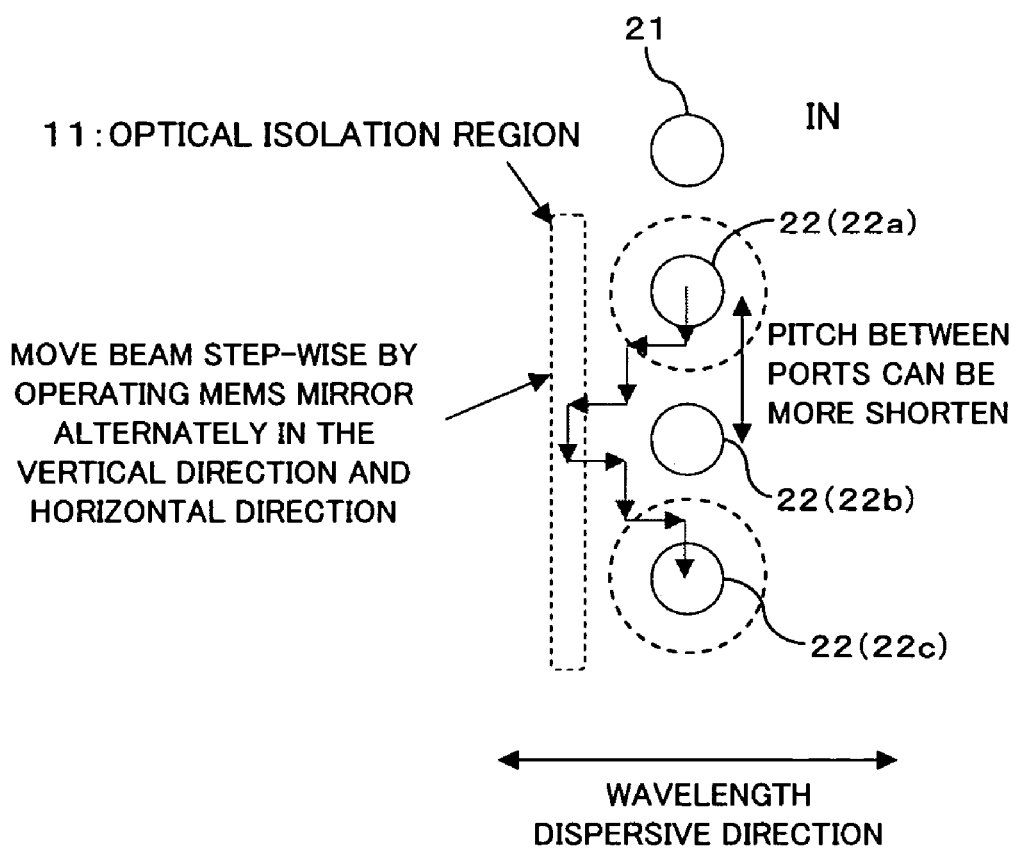
FIG. 10 is a diagram for illustrating a third modification of the embodiment.

In the above embodiment and modifications, the controlling apparatus 50 moves the beam position from an output port 22, from which the beam is moved, into the optical isolation region 11, or moves the beam position from the optical isolation region 11 to a target output port 22, by changing once the mirror angle in the horizontal direction. However, as shown in FIG. 10, the quantity of a change in the mirror angle at a time may be made minute and the quantity of movement of the beam at a time may be made minute, and the mirror angel of the MEMS mirror 4 may be changed plural times alternately in the vertical and horizontal directions, whereby the beam position is moved step-wise during a course from the starting output port 22a to the optical isolation region 11, or from the optical isolation region 11 to the target output port 22c.

By doing so, it is possible to further shorten the pitch between ports as compared with a case where the control is performed in the manner described above with reference to FIG. 2, 8 or 9. Thus, the scale of the optical switch 10 can be more reduced. In this modification, the reflected beam is moved, first, in a direction perpendicular to the wavelength dispersion direction in the first step when the switching is started, and the reflected beam is moved, first, in a direction perpendicular to the wavelength dispersion direction in the last step when the switching is ended, as well.

(A4) Fourth Modification

Figure 11:
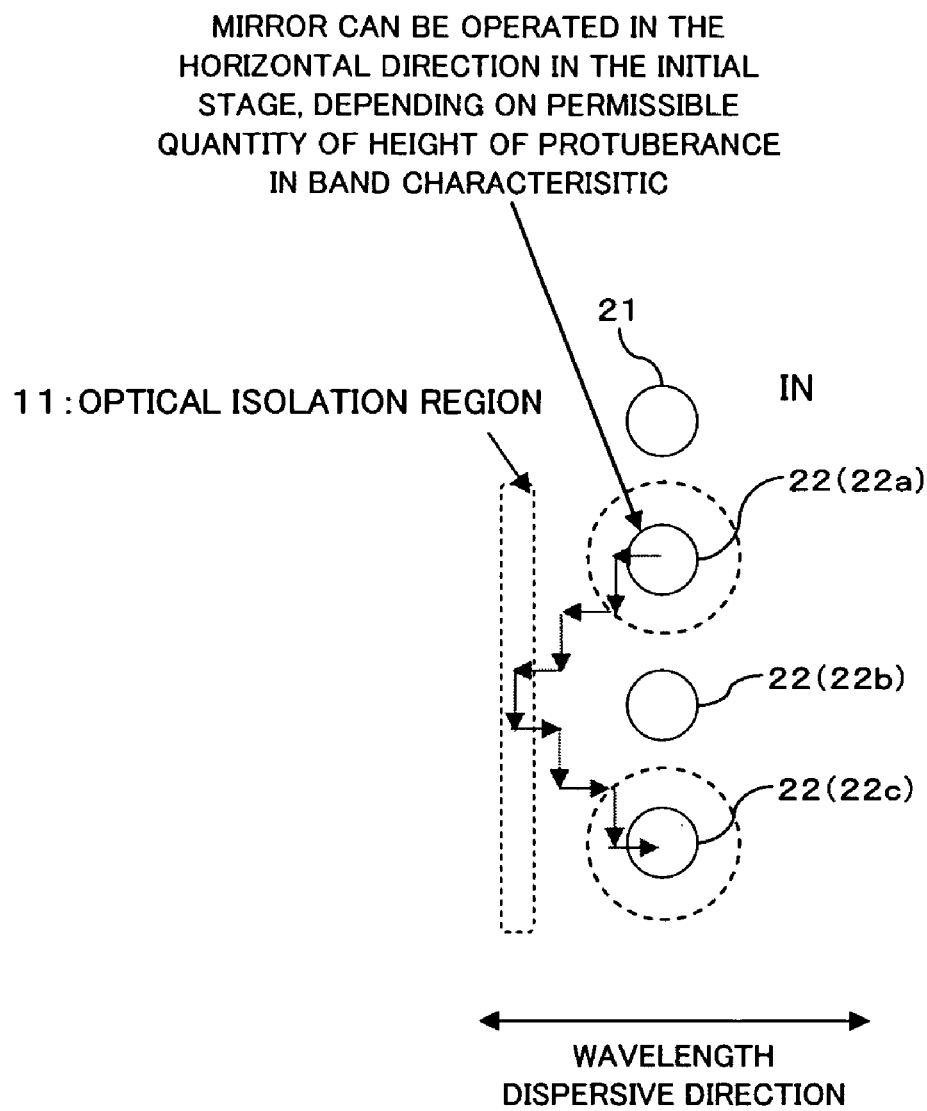
FIG. 11 is a diagram for illustrating a fourth modification of the embodiment.
Figure 17:
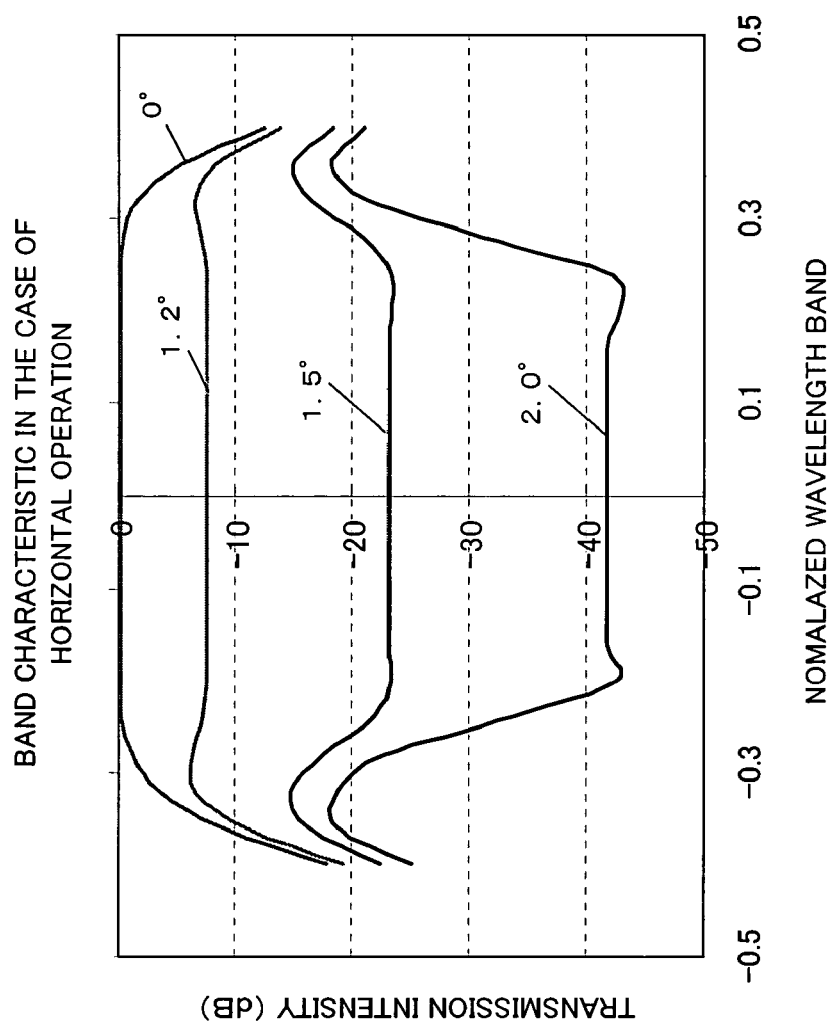
FIG. 17 is a diagram showing an example of transmission band characteristics at the time of the hitless port switching shown in FIG. 16.

Depending on the allowable quantity of the height of a protuberance (the quantity of a protuberance in the side lobe) in the transmission band characteristic described above with reference to FIG. 17, the mirror angle can be first changed in the horizontal direction to move the beam position in the horizontal direction, as shown in FIG. 11. When the quantity of a protuberance can be allowed up to 5 dB, for example, the controlling apparatus 50 can move the beam position first in the horizontal direction within a range in which the quantity of the protuberance does not exceed 5 dB. After that, the controlling apparatus 50 makes the beam position to move alternately in the vertical and horizontal directions, thereby moving the beam position to the target output port 22c via the optical isolation region 11, like the example shown in FIG. 10, for example.

(A5) Fifth Modification

In the above examples, when the beam position is initially or finally moved in the vertical direction, the beam position is moved toward the adjacent output port 22 (downward on the paper in, for example, FIG. 2). Alternatively, the controlling apparatus 50 may control the angle of a corresponding MEMS mirror 5 to move the beam position in a manner shown in FIG. 12, for example.

Figure 12:
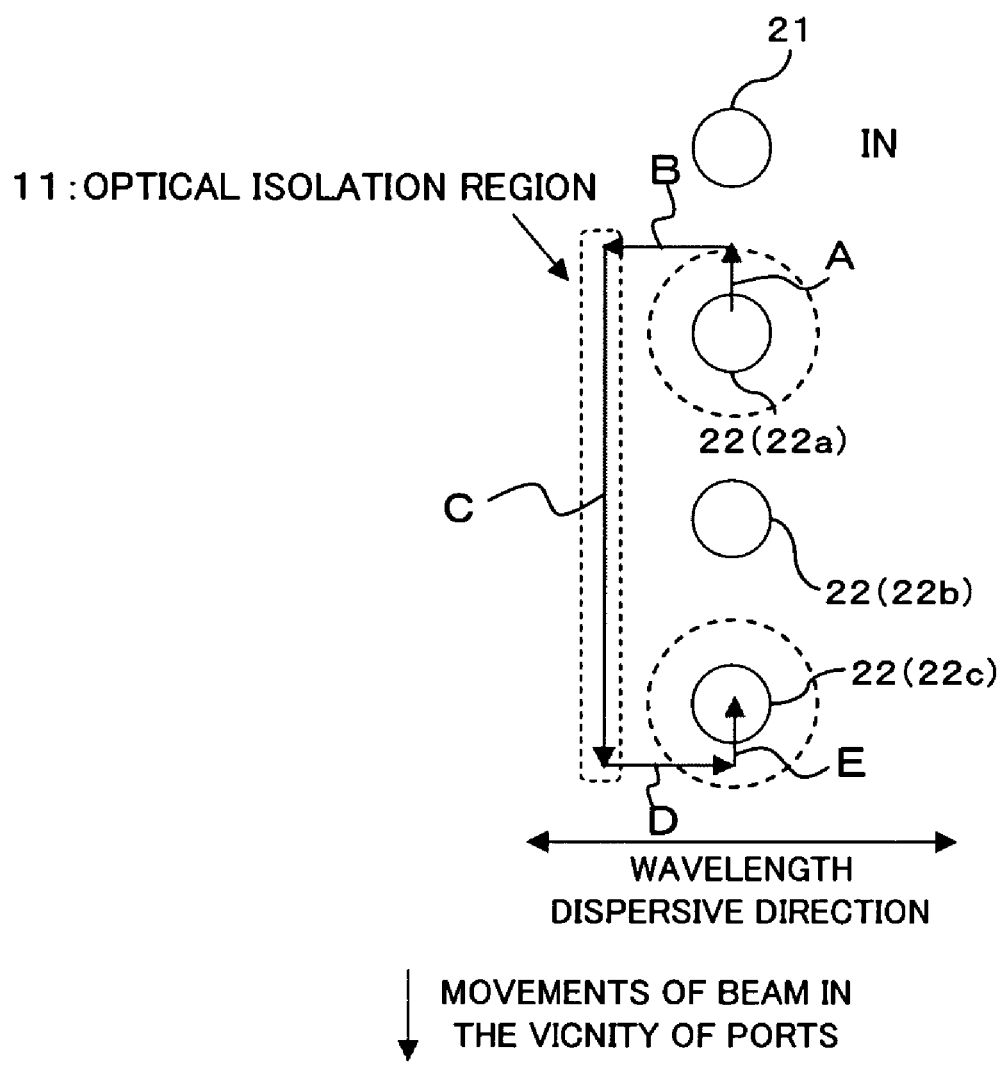
FIG. 12 is a diagram for illustrating a fifth modification of the embodiment.

As shown in FIG. 12, when the beam irradiated onto the output port 22a is desired to be irradiated onto the output port 22c, the controlling apparatus 50 moves the beam position first in a direction opposite to the adjacent output port 22 (toward the input port 21 in FIG. 12) within a range in which the leaking beam to the input port 21 is below the allowable crosstalk level) (refer to an arrow A) to linearly move the beam into the optical isolation region 11 (refer to an arrow B), then linearly moves the beam position toward the target output port 22c in the optical isolation region 11 until the beam position passes through the target output port 22c (refer to an arrow C), and finally directs the beam to the center of the target output port 22c in the same vertical direction as the first vertical operation (refer to arrows D and E). It is considered that such control is effective when switching is performed between output ports 22 located at the both ends, for example.

Note that the present invention is not limited to the above embodiment and modifications, but may be modified in various ways without departing from the scope of the invention, of course.

In the above examples, the mirror angle of the MEMS mirror 4 is changed in a direction (direction in which the ports are arranged) perpendicular to the wavelength dispersion direction (direction in which the MEMS mirrors 4 are arranged) in the initial or final movement of the beam position to move the beam position in the vertical direction. However, the beam position may be moved in a direction other than the wavelength dispersion direction, which can flatten the transmission band characteristic to some degree.

In consideration of all the above embodiment of modifications, it is preferable that, an optical switch 10 comprising the wavelength dispersing optical element 1 dispersing the input beam and at least two output ports 22 and being able to switch to the port 22, from which a beam dispersed by a deflecting means 4 is to be outputted, between the above two output ports performs a process including a first step of moving the reflected beam in a direction perpendicular to the wavelength dispersion direction when directing the reflected beam to an area (refer to circles denoted with broken lines in FIGS. 2 and 6 through 12) in the neighborhood of at least an output port 22 switched from or to be switched to, and a second step of moving the reflected beam in the wavelength dispersion direction in areas other the neighboring areas.

By including the first step, it becomes possible to decrease, even a little, the adverse effect of diffraction generated at the time of switching of the output port, as described above.

What is claimed is:

1. An optical switch comprising:
    a wavelength spatially dispersive optical element spatially dispersing a wavelength-multiplexed beam along a wavelength dispersion direction according to wavelengths;
    a plurality of output ports arranged in a column in a direction which is not parallel to the wavelength dispersion direction;
    a plurality of mirrors arranged along the wavelength dispersion direction, onto which beams dispersed by said wavelength spatially dispersive optical element are irradiated, each mirror able to reflect a beam irradiated onto the mirror to any one of said plurality of output ports by tilting the mirror to thereby change an angle of a reflecting surface of the mirror; and
    a controller, when changing an incident position of a respective reflected beam from being on a first output port of the plurality ports to being on a second output port of the plurality of output ports which is not adjacent to the first output port, tilting a respective mirror which reflects the beam so that the incident position moves in a direction perpendicular to the wavelength dispersion direction and parallel to the direction in which the plurality of output ports are arranged without exceeding an allowable crosstalk with an adjacent output port, and thereafter tilting the respective mirror so that the incident position moves in a direction parallel to the wavelength dispersion direction away from any output port.

2. A controlling apparatus for an optical switch comprising a wavelength spatially dispersive optical element spatially dispersing a wavelength-multiplexed beam along a wavelength dispersion direction according to wavelengths, a plurality of output ports arranged in a column in a direction which is not parallel to the wavelength dispersion direction and a plurality of mirrors arranged along a wavelength dispersion direction onto which beams dispersed by said wavelength spatially dispersive optical element are irradiated, each mirror able to reflect a beam irradiated onto the mirror to any one of said plurality of output ports by tilting the mirror to thereby change an angle of a reflecting surface of the mirror, said controlling apparatus comprising:
    a mirror controller, when changing an incident position of a respective reflected beam from being on a first output port of the plurality ports to being on a second output port of the plurality of output ports which is not adjacent to the first output port, tilting a respective mirror which reflects the beam so that the incident position moves in a direction perpendicular to the wavelength dispersion direction and parallel to the direction in which the plurality of output ports are arranged without exceeding an allowable crosstalk with an adjacent output port, and thereafter tilting the respective mirror so that the incident position moves in a direction parallel to the wavelength dispersion direction away from any output port.

3. The controlling apparatus for an optical switch according to claim 2, wherein, when a respective reflected beam is reflected by a respective mirror to any one of said plurality of output ports, said mirror controller changes an angle of a reflecting surface of the respective mirror along a direction other than the wavelength dispersion direction so that the reflected beam is moved in a direction other than the wavelength dispersion direction.

4. The controlling apparatus for an optical switch according to claim 2, wherein, when an incident position of respective beam reflected by a respective mirror on any one of said output ports is changed to be on another output port not adjacent to said output port, said mirror controller changes an angle of a reflecting surface of the respective mirror in such a manner that said controller moves the incident position of the reflected beam in a direction other than the wavelength dispersion direction, and combines movements of the incident position in the direction in which said mirrors are arranged and a direction other than the wavelength dispersion direction so as to reflect the beam onto the another output port.

5. The controlling apparatus for an optical switch according to claim 4, wherein for each mirror,
the respective mirror is operable about two axes so as to be able to change an angle of a reflecting surface of the respective mirror in the direction in which said plurality of mirrors are arranged and the direction in which said plurality of output ports are arranged; and
when the incident position of a beam reflected by the respective mirror to any one of said plurality of output ports is changed to another output port not adjacent to said output port, said mirror controller controls the angle of the reflecting surface of said respective mirror in the direction in which said plurality of mirrors are arranged and the direction in which said plurality of output ports are arranged so as to move the incident position of the reflected beam to the another output port.

6. The controlling apparatus for an optical switch according to claim 5, wherein, for each mirror,
when an incident position of a respective beam reflected by the respective mirror is moved from one output port toward an adjacent output port, said mirror controller monitors an optical power at said adjacent output port, and controls an angle of a reflecting surface of the respective mirror so that a monitor value obtained in the monitoring does not exceed an allowable crosstalk level.

7. The controlling apparatus for an optical switch according to claim 5, wherein, for each mirror,
said mirror controller changes the angle of the reflecting surface of said respective mirror to a predetermined angle so that an optical power at said adjacent output port does not exceed an allowable crosstalk level.

8. The controlling apparatus for an optical switch according to claim 5, wherein a distance between adjacent output ports is set to be within a range in which an optical transmission band characteristic at an output port from which an incident position of a reflected beam is moved is below a predetermined attenuation level and an optical transmission band characteristic at said adjacent output port does not exceed an allowable crosstalk level when the incident position of the reflected beam is moved toward said adjacent output port by said mirror controller.

9. The controlling apparatus for an optical switch according to claim 5, wherein, when the incident position of a reflected beam is changed from one output port to another output port not adjacent, said mirror controller controls a angle of a reflecting surface of a respective mirror reflecting the beam in such a manner that said mirror controller moves the incident position of the reflected beam in a direction other than the wavelength dispersion direction, and changes the angle of the reflecting surface of said respective mirror alternately in the direction in which said plurality of mirrors are arranged and a direction other than the wavelength dispersion direction so as to move the incident position of the reflected beam step-wise.

10. A controlling method in an optical switch comprising a wavelength spatially dispersive optical element for spatially dispersing an input beam in a first plane, a plurality of output ports disposed in a column which is in a plane perpendicular to the first plane, and a deflector optically positioned between the dispersive optical element and the column of output ports to deflect the dispersed beam to a respective output port of the plurality of output ports and thereby be output from the respective output port, the optical switch being able to switch the dispersed beam from being deflected by the deflector to a first output port of the plurality of output ports and thereby being output from the first output port to being deflected by the deflector to a second non-adjacent output port of the plurality of output ports and thereby be output from the second output port, the method comprising:
moving, by rotation of the deflector, the dispersed beam initially being deflected to the first output port in a direction perpendicular to the first plane and parallel to the column of output ports without exceeding an allowable crosstalk with an adjacent output port; and
moving, by rotation of the deflector, the reflected beam in a direction parallel to the first plane in a position away from a vicinity of any output port.

11. The controlling method in an optical switch according to claim 10, wherein, when the dispersed beam is deflected to any one of said output ports, an angle of a deflecting surface of the deflector is changed in a direction other than a direction parallel to the first plane.

12. The controlling method in an optical switch according to claim 10, wherein, when an incident position of the dispersed beam deflected on any one of said plurality of output ports is changed to be on another output port not adjacent, an angle of a deflecting surface of the deflector is controlled in such manner that the incident position of the deflected beam is moved in a direction other than a direction parallel to the first plane, and movements of the incident position in the direction parallel to the first plane and a direction other than the direction parallel to the first plane are combined so that the deflected beam is reflected to the another output port.

13. The controlling method in an optical switch according to claim 12, wherein said deflector is operable about two axes so as to be able to change the angle of the deflecting surface in the direction parallel to the first plane and a direction parallel to the column of output ports; and
when an incident position of the deflected beam on any one of said plurality of output ports is changed to be on another output port not adjacent, the angle of the deflecting surface is controlled in the direction parallel to the column of output ports to move the incident position of the deflected beam toward an adjacent output port, and controls the angle of the deflecting surface of the deflector in the direction parallel to the first plane and the direction parallel to the column of output ports so that the incident position of the deflected beam is moved to the another output port.

14. The controlling method in an optical switch according to claim 13, wherein, when the incident position of the deflected beam is moved toward said adjacent output port, an optical power at said adjacent output port is monitored, and the angle of the deflecting surface of the deflector is controlled so that a monitor value obtained in the monitoring does not exceed an allowable crosstalk level.

15. The controlling method in an optical switch according to claim 13, wherein a distance between adjacent output ports of said plurality of output ports is set to be within a range in which an optical transmission band characteristic at an output port from which the incident position is moved is below a predetermined designed attenuation level and the optical transmission band characteristic at said adjacent output port does not exceed the allowable crosstalk level when the incident position of the deflected beam is moved toward said adjacent output port.

16. The controlling method in an optical switch according to claim 12, wherein, when the incident position of the deflected beam is changed to be on another output port not adjacent, the angle of the deflecting surface of the deflector is controlled in such a manner that the incident position of the deflected beam is moved in a direction other than the direction parallel to the first plane, and the angle of the deflecting surface is changed alternately in the direction parallel to the first plane and a direction other than the direction parallel to the first plane so as to move the incident position of the deflected beam step-wise.

17. A controlling method in an optical switch comprising a wavelength spatially dispersive optical element spatially dispersing a wavelength-multiplexed beam along a wavelength dispersion direction according to wavelengths, a plurality of output ports arranged in a column in a direction which is not parallel to the wavelength dispersion direction, and a plurality of mirrors arranged along a wavelength dispersion direction onto which beams dispersed by said wavelength spatially dispersive optical element are irradiated, each mirror able to reflect a beam irradiated onto the mirror to any one of said plurality of output ports by tilting the mirror to thereby change an angle of a reflecting surface of the mirror, said controlling method comprising:

when an incident position of a respective reflected beam is changed from being on a first output port of the plurality ports to being on a second output port of the plurality of output ports which is not adjacent to the first output port, tilting a respective mirror which reflects the beam so that the incident position moves in a direction perpendicular to the wavelength dispersion direction and parallel to the direction in which the plurality of output ports are arranged without exceeding an allowable crosstalk with an adjacent output port, and thereafter tilting the respective mirror so that the incident position moves in a direction parallel to the wavelength dispersion direction away from any output port.

18. An optical switch according to claim 1, wherein, after the controller tilts the respective mirror so that the incident position moves in a direction parallel to the wavelength dispersion direction away from any output port, the controller tilts the respective mirror so that the incident position moves to the second output port.

19. A controlling method in an optical switch comprising a wavelength spatially dispersive optical element for spatially dispersing an input beam in a first plane, a plurality of output ports disposed in a column which is in a plane perpendicular to the first plane, and a deflector optically positioned between the dispersive optical element and the column of output ports to deflect the dispersed beam to a respective output port of the plurality of output ports and thereby be output from the respective output port, the optical switch being able to switch the dispersed beam from being deflected by the deflector to a first output port of the plurality of output ports and thereby being output from the first output port to being deflected by the deflector to a second non-adjacent output port of the plurality of output ports and thereby be output from the second output port, the method comprising:

moving, by rotation of the deflector, the dispersed beam initially being deflected to the first output port in a direction parallel to the first plane without exceeding a predetermined value of a side-lobe appearing in a spectral transmission curve of the first output port;

then moving the deflected beam in a direction perpendicular to the first plane and parallel to the column in which the output ports are disposed without exceeding an allowable crosstalk with an adjacent port;

then moving the reflected beam in a direction parallel to the first plane in a position away from a vicinity of any output port.

20. An optical switch comprising:

a wavelength spatially dispersive optical element spatially separating a wavelength-multiplexed light into a plurality of dispersed beams along a wavelength dispersion direction according to wavelengths;

a plurality of output ports, including at least three output ports, arranged in a column in a direction which is not parallel to the wavelength dispersion direction;

a plurality of mirrors arranged along the wavelength dispersion direction, onto which the dispersed beams are irradiated, each mirror able to reflect a beam irradiated onto the mirror to any one of the plurality of output ports by tilting the mirror; and a controller, when changing an incident position of a respective reflected beam from being on a first output port of the plurality ports to being on a second output port of the plurality of output ports which is not adjacent to the first output port, tilting a respective mirror which reflects the beam so that the incident position moves away from the first output port in a direction along the column without exceeding a monitored allowable crosstalk with an adjacent output port, then tilting the respective mirror so that the incident position moves away from the column and into an optical isolation region, then tilting the respective mirror so that the incident position moves around the adjacent output port and closer to the second output port while remaining in the optical isolation region, so that the incident position remains in the optical isolation region but is aligned with the second output port, then tilting the respective mirror so that the incident position moves from the optical isolation region toward the column so that the incident position moves to a position aligned along the column, then tilting the respective mirror so that the incident position moves in a direction along the column so that the incident position is on the second output port.

* * * * *

UNITED STATES PATENT AND TRADEMARK OFFICE
CERTIFICATE OF CORRECTION

| | | |
|---|---|---|
| PATENT NO. | : 7,447,399 B2 | Page 1 of 1 |
| APPLICATION NO. | : 11/082806 | |
| DATED | : November 4, 2008 | |
| INVENTOR(S) | : Hirofumi Aota et al. | |

It is certified that error appears in the above-identified patent and that said Letters Patent is hereby corrected as shown below:

Column 14, Line 41, change "the wavelength dispersion direction" to --the wavelength dispersion direction,--.

Column 15, Line 5, change "of" to --of a--.

Signed and Sealed this

Twenty-seventh Day of January, 2009

JOHN DOLL
*Acting Director of the United States Patent and Trademark Office*